Feb. 20, 1951     I. ENGSTROM     2,542,403
ADDING MACHINE
Filed March 31, 1949     7 Sheets-Sheet 1
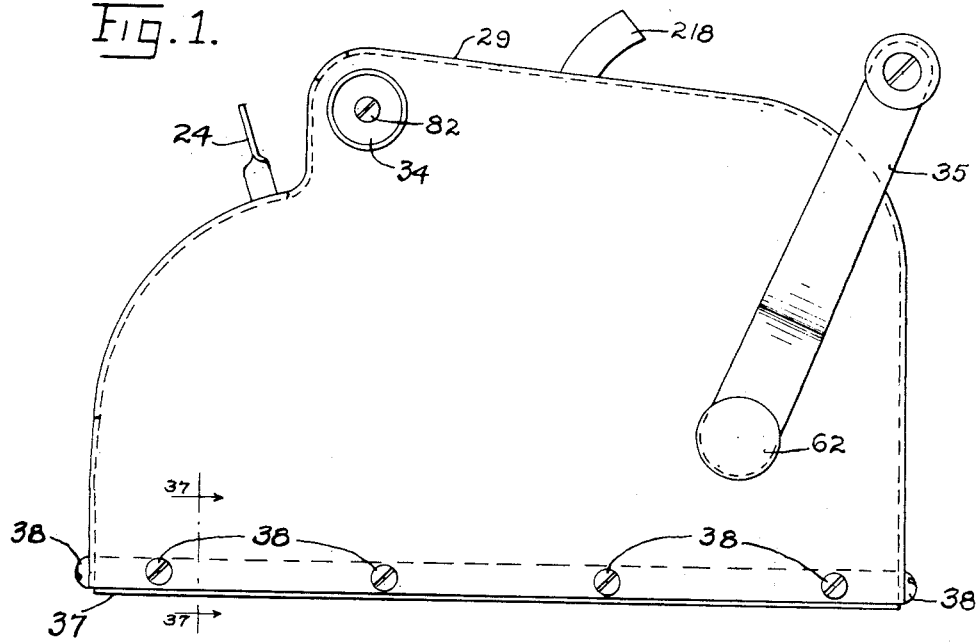
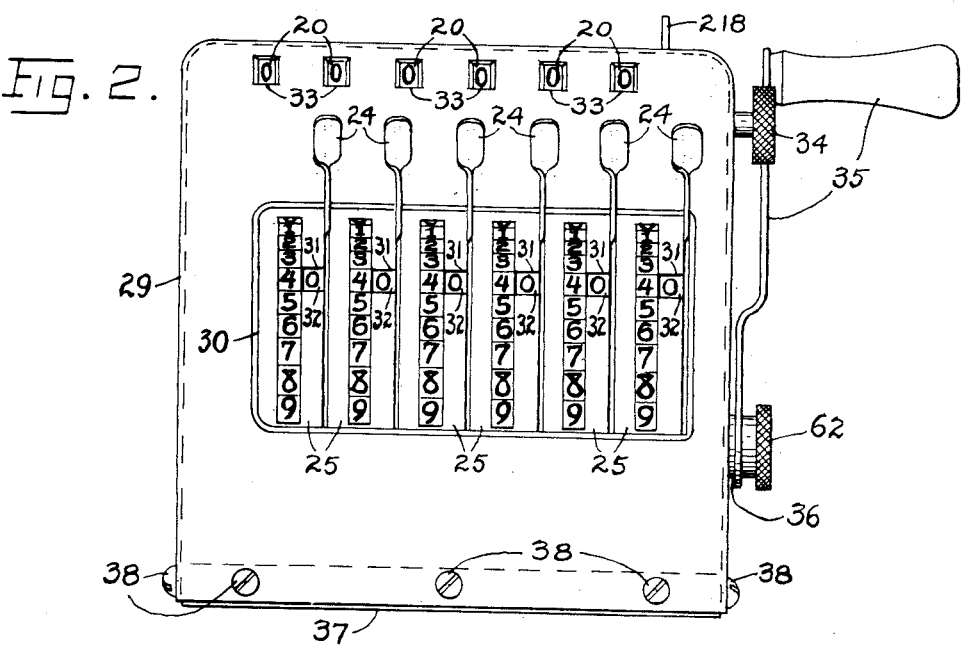
INVENTOR.
IVAN ENGSTROM
BY Albert C. Bell
ATTORNEY.

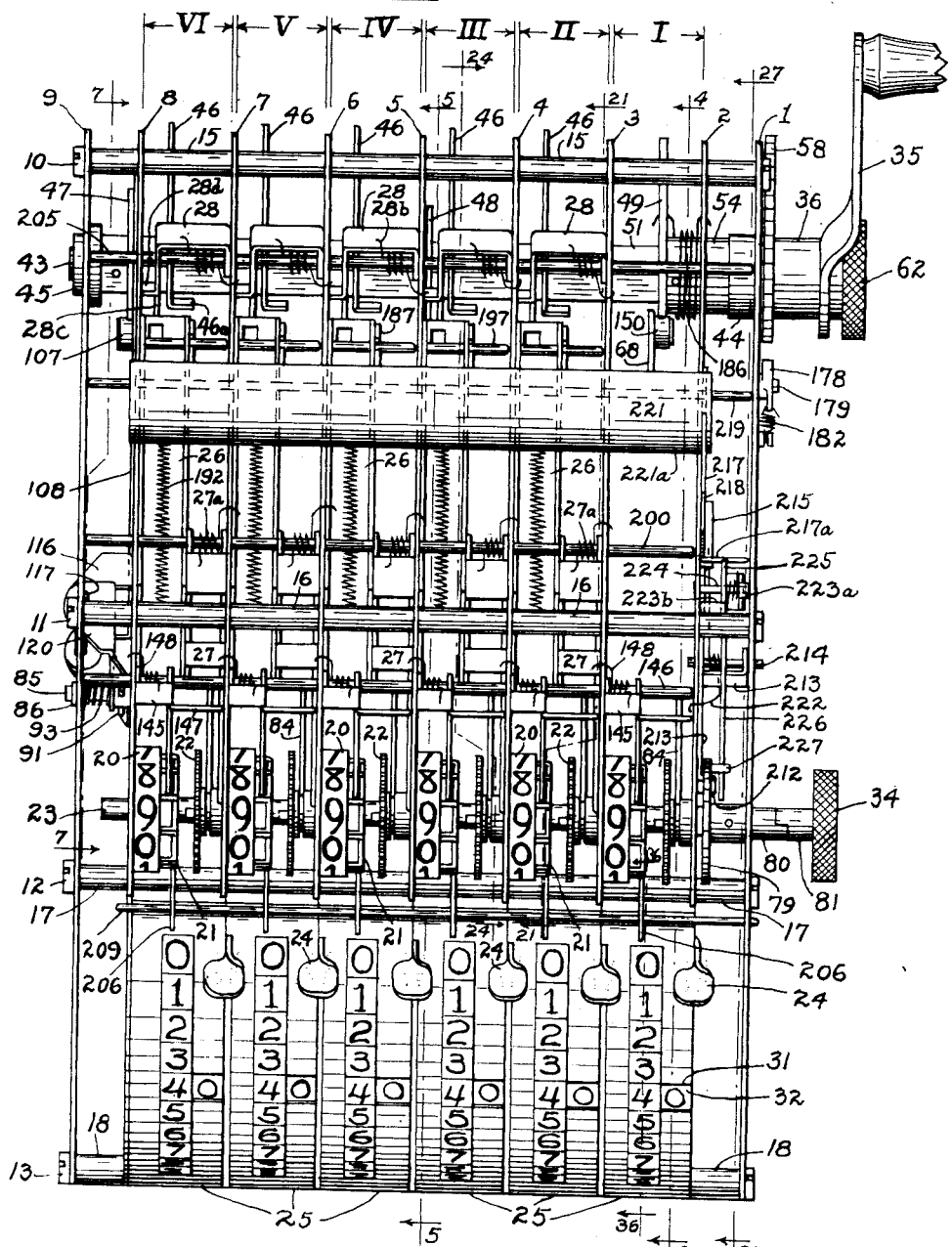

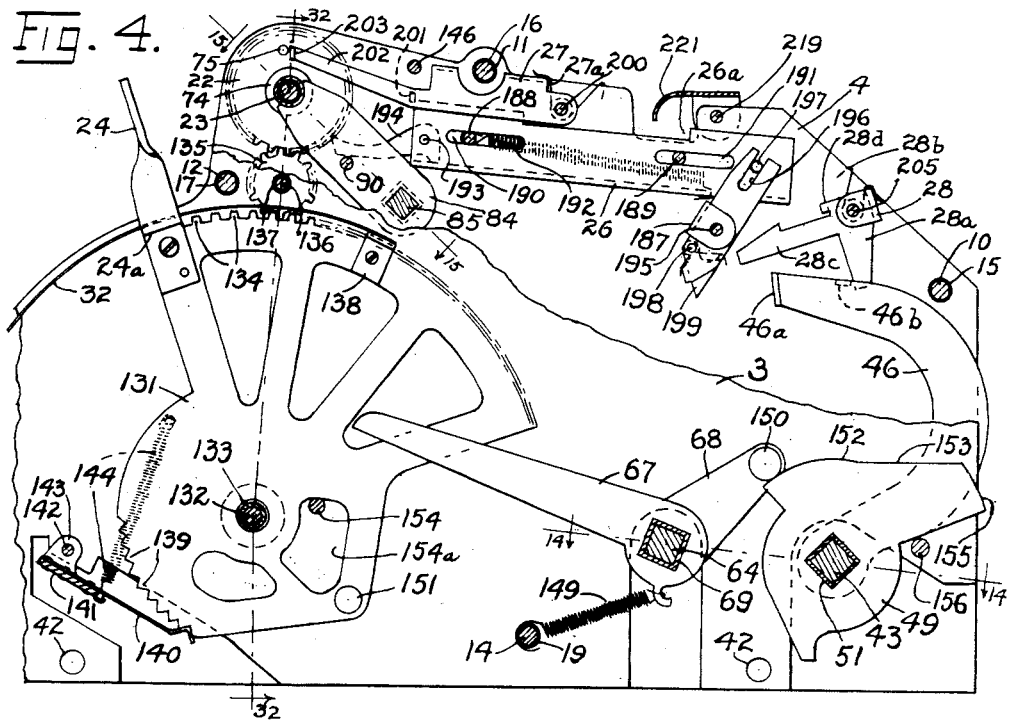

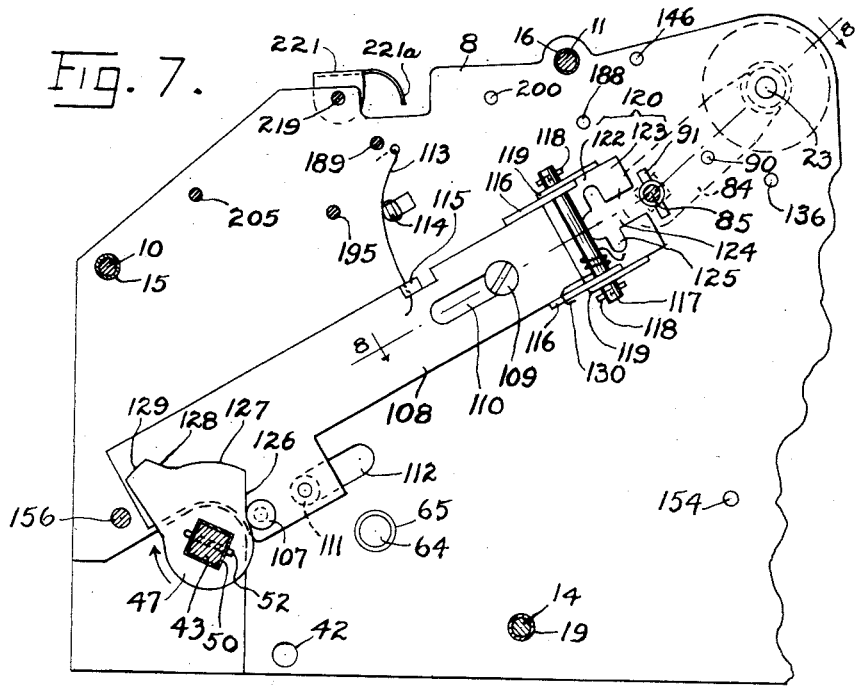
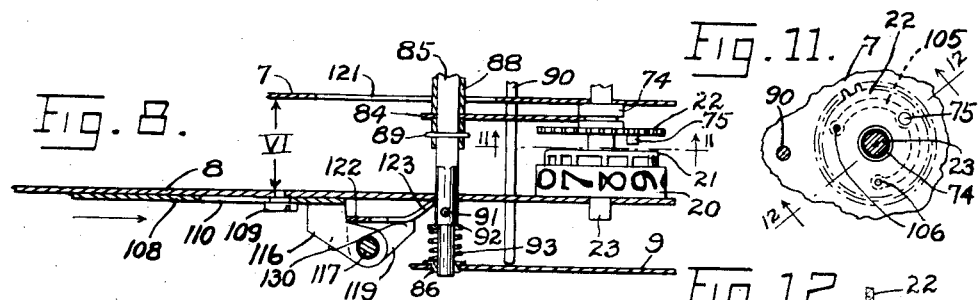
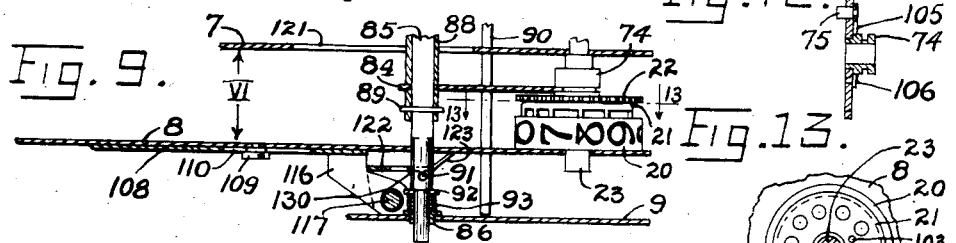
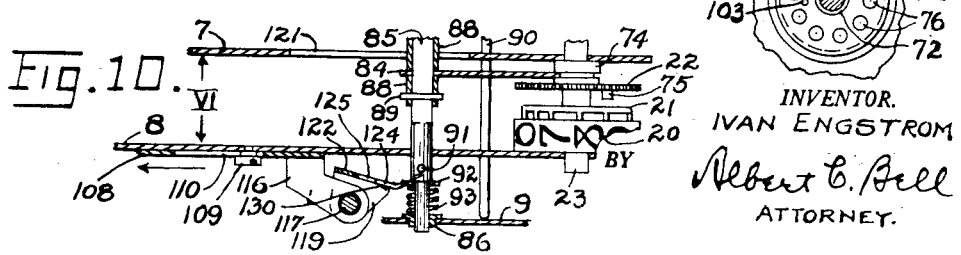

Feb. 20, 1951        I. ENGSTROM        2,542,403
ADDING MACHINE
Filed March 31, 1949        7 Sheets-Sheet 5
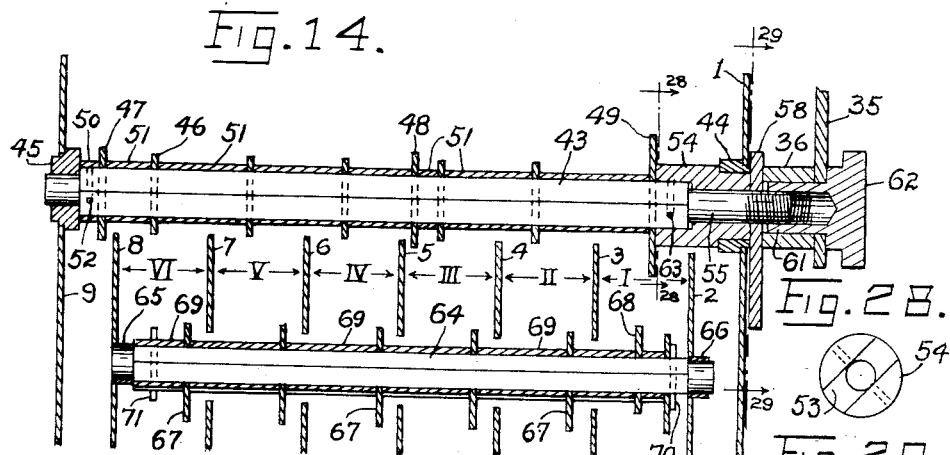
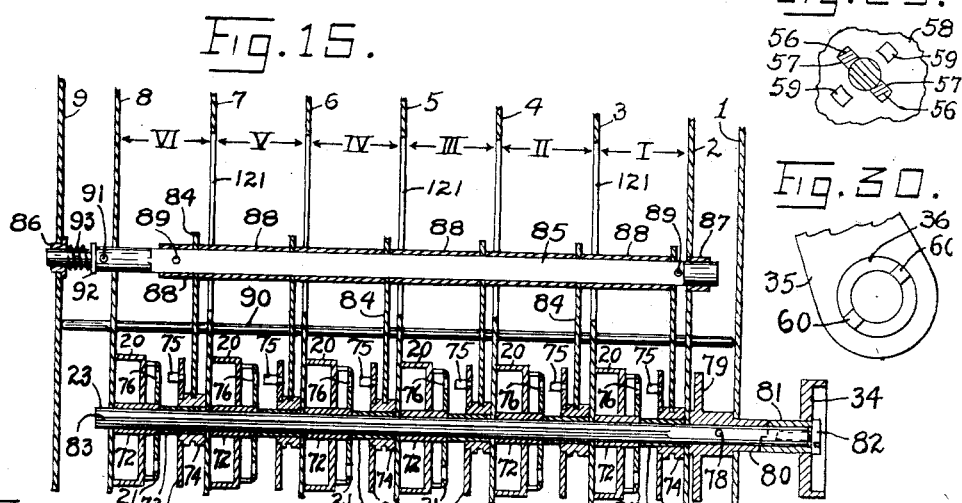
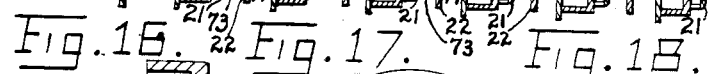
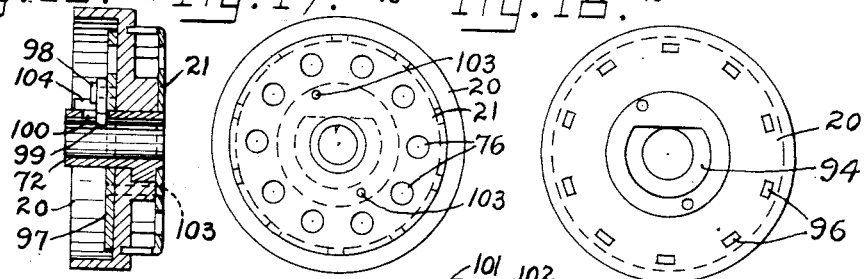
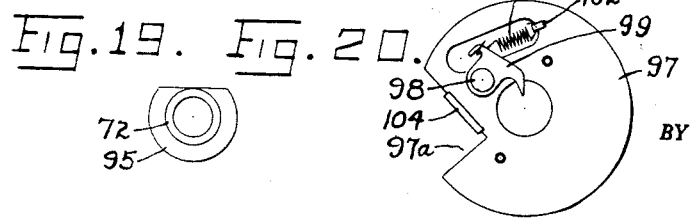
INVENTOR.
IVAN ENGSTROM.
BY Albert C. Bell
ATTORNEY.

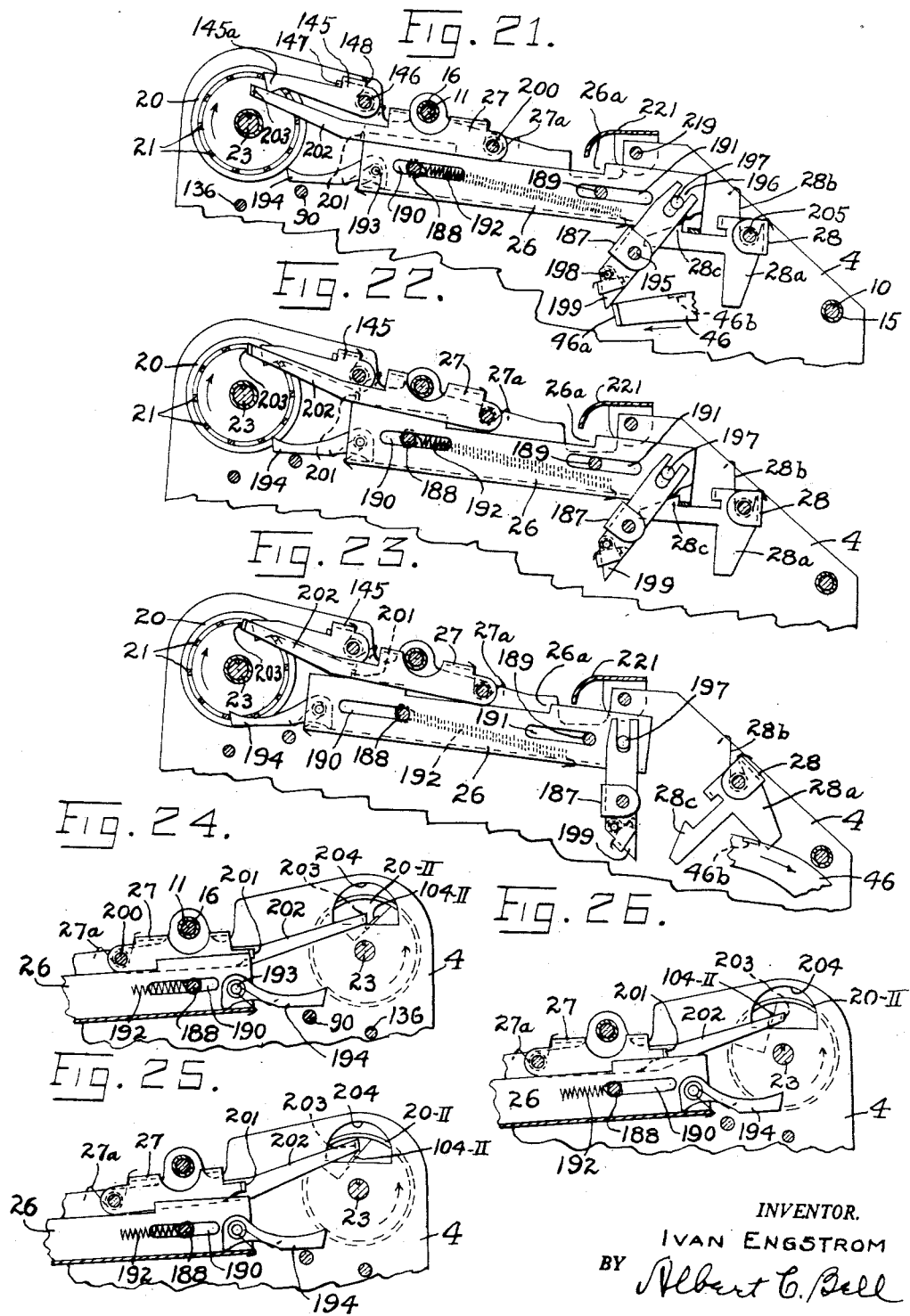

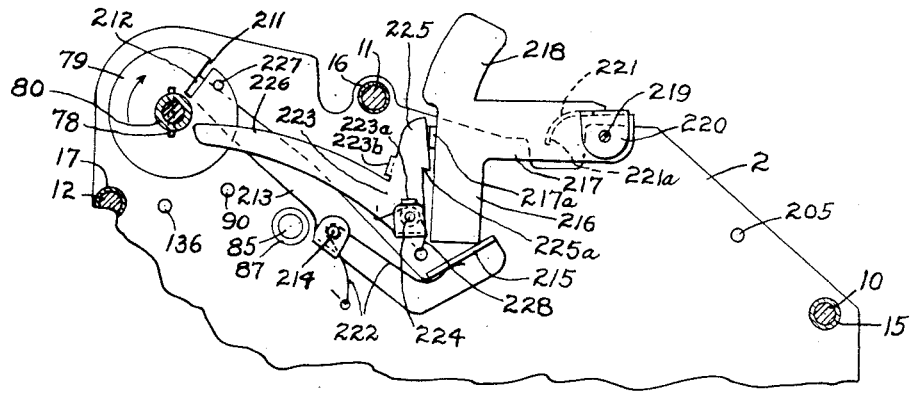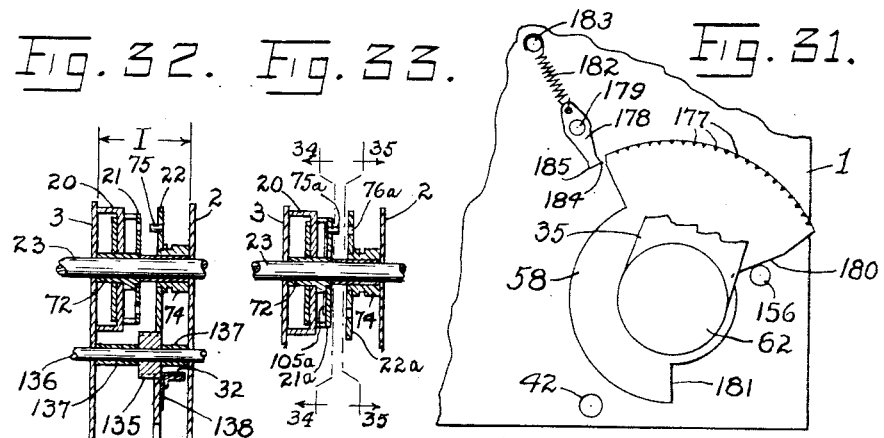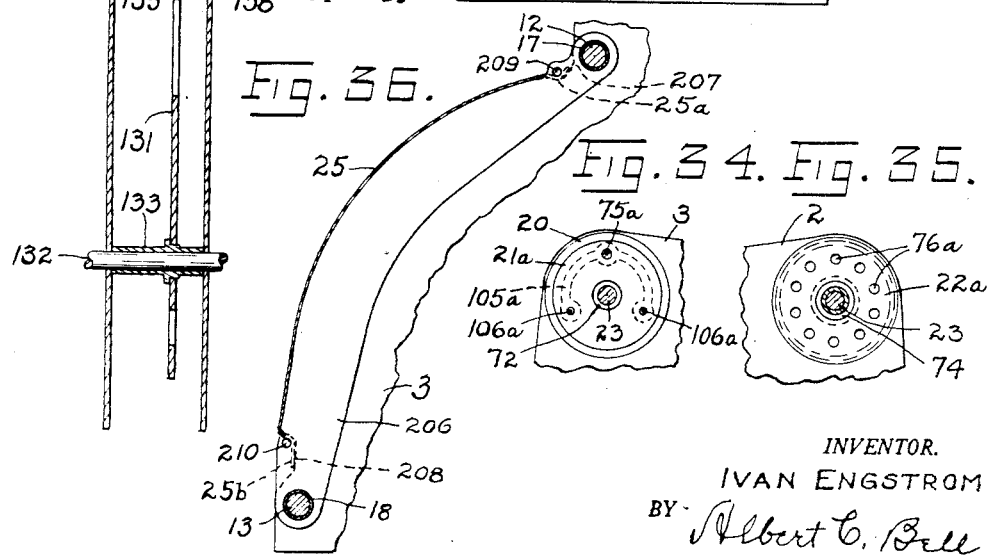

Patented Feb. 20, 1951

2,542,403

UNITED STATES PATENT OFFICE 2,542,403

ADDING MACHINE

Ivan Engstrom, Chicago, Ill.; Dorothy Engstrom administratrix of said Ivan Engstrom, deceased Application March 31, 1949, Serial No. 84,711

15 Claims. (Cl. 235—81)

It is an object of the invention to produce an adding machine including a keyboard for setting up in ordered arrangement numerical items to be summated, and mechanism for transferring said items successively to totalizing devices affording a visual indication of the sum or total of said items and by the same operation clearing the keyboard of each set-up item and restoring said keyboard to its initial or zero condition by each said transfer, and including also means for clearing said totalizing devices and restoring them to initial or zero condition at the will of the operator after each complete totalizing operation has served its purpose, and effecting all of said operations by novel mechanism and with a degree of accuracy and reliability not attainable with heretofore proposed adding machines for reasons below set forth.

The machine of the invention has a keyboard of the sector type, ordered and angularly movable sectors being employed in the set-up mechanism, said sectors having radially extending fingers which together with stationary digit indicators constitute the keyboard of the machine, a spring detent being provided for each sector to yieldingly hold it in any set-up position to which it may be moved. The machine employs ordered totalizer wheels axially aligned and carrying printed or embossed numerical figures readable through a sight opening or openings in the machine casing to give an indication of the total amount of operation of the totalizer wheels; said totalizer wheels are respectively provided with attached ratchet wheels of novel construction below described, which ratchet wheels respectively include side walls, each having formed therein or therethrough equally spaced clutch openings in a circular arrangement coaxial with the ratchet wheel, which openings are the same in number as the number of indicating figures or numerals on the corresponding totalizer wheel.

Each of the set-up sectors carries or has formed on its edge, gear teeth of a segmental gear, meshing at all times with the teeth of an idler gear, which idler gear has its teeth at all times in mesh also with the teeth of a transfer gear supported for independent rotation on the shaft supporting the totalized wheels. Each transfer gear is movable axially on the shaft supporting it, for clutching purposes, and carries a clutch pin in radial alignment with the clutch openings in an adjacent one of the totalizer ratchet wheels, each of said transfer gears being mounted on its supporting shaft adjacent one of said totalizer ratchet wheels and movable towards and from said ratchet wheel to engage and disengage its clutch pin with an opening or hole in the ratchet wheel determined by the angular position the corresponding totalizer wheel may then have on its supporting shaft.

The machine of the invention is provided with a handle or crank for operation after each keyboard set-up is effected, and cam devices operated by said handle effect the operations below described.

It will be noted that operating the set-up fingers to set up a desired item on the keyboard, serves only to impart angular movement to the sectors, to the idler gears and to the transfer gears, the latter then being in positions entirely disengaging their clutch pins from the totalizer ratchet wheels. It is also to be noted that spring detents are provided for the totalizer wheels, each engaging one of said totalizer ratchet wheels and tending to hold the corresponding totalizer wheel in its position of last operation. The totalizer detents and the sector detents are so related that for any selected position of any sector in effecting any keyboard set-up, the clutch pin of the corresponding transfer gear is in alignment with one of the clutch openings in the adjacent totalizer ratchet wheel.

Thus, there being no operating connection of any kind between the sectors and the totalizer wheels during a keyboard set-up operation, when any said set-up is being made the operator may change it in any manner he pleases, without in any way affecting the totalizer wheels, the final set-up amount on the keyboard immediately preceding a transfer operation, being the only amount that can then be transferred to the totalizer wheels.

The operating handle of the machine when at rest is preferably in a back position away from the operator, and a complete cycle of operation of said handle includes a complete forward movement of said handle and then a complete back stroke thereof. In view of it being important to the successful operation of the machine that the forward movement of the handle be complete before its back movement is begun, and that, once begun, the back movement of the handle shall be complete, a full-stroke mechanism as below described is employed to insure movement of the handle through its entire cycle of operation, whenever said handle is given any forward movement from its back position.

After a desired keyboard set-up has been established, movement of the operating handle from its back position as far as the transfer operation is concerned, first, by the cam devices referred to, moves all of the clutch pins so that they enter the openings in the totalizer ratchet wheels with which they are in alignment. This, because of the positive gearing of the sectors to the transfer gears, and because of the positive clutch engagement between the transfer gears and the ratchet wheels rigidly connected with the totalizer wheels, establishes for the time of transfer, a positive and unyielding train of mechanism between each sector and the corresponding totalizer wheel; during the transfer, any and all movement of each sector is accurately reflected in movement of the corresponding totalizer wheel, and it is impossible for any totalizer wheel to have any movement not imparted to it by movement of the corresponding sector.

Continued forward movement of the operating handle maintains the positive clutch engagement referred to, and by said cam devices operates a sector returning shaft having radially extending arms rigidly carried thereby which engage studs on the sectors and move the latter back towards their zero positions. The returning movement of each sector begins at a point in the movement of its returning arm determined by the amount of forward movement previously given the sector in establishing the set-up being transferred, and ends when the sector reaches a fixed stop determining its zero position; the returning or back movement of each sector thus effected, advances the totalizer wheel then positively clutched to the corresponding transfer gear which in turn is positively geared to the sector, the same number of units as required to move the sector back to its zero position, or differently stated, the units represented by the set-up of the sector are positively and accurately transferred to the totalizer wheel, there is no possibility of slippage during the transfer movement and the totalizer wheel must advance the same number of units as the units of set-up of the sector, and the totalizer wheel cannot have greater angular movement than the movement given it by resetting the sector to its zero position, and the possibility of overthrow of the totalizer wheel is avoided, regardless of the rapidity of movement of the operating handle. Adding machines have heretofore commonly employed pawl and ratchet mechanisms for operating their totalizer wheels, and overthrow with such machines has frequently occurred, coupled with inaccurate indications of totals, a result impossible with the present invention.

After the forward movement of the operating handle has reset the sectors to their zero positions, and said totalizer wheels are at rest and under the control of their spring detents, the operating handle has a small remaining amount of forward movement which by said cam devices, moves said transfer gears away from the adjacent totalizer ratchet wheels a sufficient distance to move the clutch pins from engagement with said ratchet wheels, thereby freeing said sectors for the next set-up operation.

It is a further object of the invention to reduce the load on the operating handle during the sector resetting operation, as much as possible without sacrificing accuracy of operation and without making the machine unduly complicated. If no devices were employed to prevent it, the load on the handle would necessarily include the full resistance of the totalizer spring detents and of the sector spring detents, as well as of the spring employed to hold the handle in its back position until it is desired to effect a transfer operation.

The invention provides means for materially reducing said load on the operating handle as follows. The sector spring detents are all mounted on a common bar which at its ends is pivotally supported by the frame of the machine, so that it may be oscillated to move the sector engaging portions of the detents towards and from the sectors which are notched at their edges to cooperate with said detents. A toothed disk is mounted for rotation on a fixed part of the machine, for operation by said cam devices. The disk is positioned relatively to a free edge of said mounting bar so that in a first operative position of said disk, the bar edge rests between any two adjacent teeth of said disk, at which time a relatively strong spring or springs connected with said bar press the latter firmly against said disk to in turn press the detents with maximum holding pressure against the sectors; and so that in a second operative position of said disk, the bar edge is in engagement with one of said adjacent teeth of said disk, to move the detents away from the sectors enough to either substantially reduce their sector holding action or to entirely eliminate said holding action, as preferred. At the beginning of each transfer operation, the rotary disk is in its first position and the detents exert their full holding effect on the sectors; when the operating handle has been moved forwardly enough to enter the clutch pins into the clutch openings in the totalizer ratchet wheels, means between said disk and said cam devices of the machine, begin the turning of said disk from its first position to its second position, which movement to its second position is completed at the time the clutching operation is completed and before resetting movement of the sectors is begun, and the disk is held in said second position by said cam devices during the entire sector resetting operation; when the resetting operation has been completed and simultaneously with the operation disengaging the clutch pins from the totalizer ratchet wheels, said cam devices move said disk from its second position to its first position, thereby restoring the full effect of said sector detents, and placing the sectors in condition for the next set-up operation.

It is a further object of the invention to produce a carry-over mechanism for the machine, of the delayed carry-over type, which by a simple, effective and novel construction below described, first stores any carry-over required by any transfer operation, and then at the end of each back movement of the operating handle, operates the totalizer wheels to accurately and reliably add said carry-over to the total indicated by said totalizer, thereby accurately indicating the total summation of the several set-up items transferred to the totalizer wheels since the last re-setting or clearing thereof.

To effect said carry-over, the invention provides each totalizer wheel excepting the one of lowest order, with a carry-over slide having reciprocatory movement towards and from the associated totalizer wheel and having a spring-actuated pawl in line with the ratchet wheel attached thereto. Each slide cooperates with two latches, a first of which is a trigger latch engaging the slide and preventing its carry-over movement unless said latch is actuated by movement of the totalizer wheel of next lower order from its "9" to its "0" position, and the second of which is a timing latch and restrains the slide against carry-over movement when said slide is released by said trigger latch, until just before the operating handle reaches the end of its back stroke. The trigger latch is provided with an arm having an end lug extending through an opening in a partition of the machine between said trigger latch and the totalizer wheel of next lower order, which lug extends into the path of a cam carried by the last mentioned totalizer wheel in such a manner that when in any way the latter is rotated from its "9" position of indication to its "0" position, its cam raises said arm and thus moves the trigger latch enough to free the slide from restraint by said trigger latch, and an operating spring connected with the slide at once moves the latter forwardly towards the totalizer wheel cooperating with said slide, a small amount sufficient to prevent reestablishing holding engagement between said trigger latch and said slide when the lug of the latter latch is freed from the totalizer cam of next lower order, which occurs just before the totalizer wheel of next lower order reaches its "0" position; said small amount of forward movement of the slide is not enough to bring the pawl of the slide into engagement with its associated totalizer ratchet wheel, and is permitted by a corresponding amount of play between the timing latch and the portion of the slide engaged by it, said timing latch for the moment being the only means restraining the slide from forward movement by its actuating spring to advance the associated totalizer wheel one unit; in its position of rest, said lug of the trigger latch rests on the lower edge of the opening in the partition through which it passes, and a second lug carried by said trigger latch lies in the path of forward movement of the slide and prevents forward movement of any kind under the action of its spring as long as that relation of parts continues, which is as long as there is no need for a carry-over operation by the slide, and at that time, regardless of the position of the timing latch, the latter exercises no restraint against forward movement of the slide; when the arm of the trigger latch is raised by the totalizer cam of next lower order, the second lug of said latch is raised to entirely clear the slide, which permits instantaneous and entirely unrestrained forward movement of the slide the small amount referred to before such movement is stopped by the timing latch, as a result of which, when the first mentioned lug of said trigger latch is freed from the totalizer cam, the trigger latch, under the action of its returning spring, cannot then return to its position of rest, but, by the engagement of its second lug with an upper longitudinal surface of the slide is held in a somewhat raised position, which condition of the trigger latch continues through the carry-over operation and until the slide is moved to its extreme back position; the timing latch is provided with a spring holding it in its slide restraining position at all times excepting when the operating handle is in its extreme back position, means being provided on the operating shaft secured to said operating handle, by which the timing latch is moved to its slide releasing position during the last part of the back movement of the operating handle, which frees the slide, and the latter is then moved by its actuating spring through the remainder of its possible forward movement, by which its pawl engages the totalizer ratchet wheel and advances the totalizer wheel one unit and effects the necessary carry over. The means employed to move the timing latches of the machine to releasing or inoperative postiion at the end portion of the back stroke of the operating handle, also serve to free said timing latches during the first part of the forward movement of each cycle of operation of the operating handle, and at the same time or immediately thereafter, additional means controlled by the operating shaft move any of the slides that may then be in their forward positions as a result of effecting carry-over operations, to their rear positions and into holding engagement with said trigger latches with the timing latches in position to serve their holding purpose above described, which operations are completed before the transfer movement of the totalizer wheels above described, is begun by continued forward movement of the operating handle.

The carry-over operation may involve first, a single unit of advance for each totalizer wheel of next higher order than a totalizer wheel of lower order moved from its "9" position to or through its "0" position by a transfer operation; or second, a corresponding unit of advance for each of adjacent totalizer wheels of higher order initiated by movement of the totalizer wheel of the order next lower than the lowest of said totalizer wheels, where all of the totalizer wheels of higher order are in their "9" positions before the carry-over operation, in which case the carry-over movement of said totalizer wheels is successive from lower to higher order, each of said totalizer wheels of higher order initiating in turn the carry-over movement of the totalizer wheel of next higher order.

A further object of the invention is to provide the machine with means for resetting the totalizer wheels to their "0" positions when desired, which means includes devices preventing the resetting operation unless all of the carry-over slides are in their extreme back or retracted positions away from the totalizer wheels, to protect the carry-over pawls and totalizer ratchet wheels from damage that might occur if the pawls were not fully withdrawn and held so at the time of resetting, which retracted or back positions of the slides may readily be effected if a carry-over operation immediately preceded an attempted resetting operation, by an idle cycle of movement of the operating handle having no effect excepting to retract such of the slides as may then be in their carry-over positions. Said resetting means also includes devices for stopping the resetting movement of the totalizer wheels when they reach their "0" positions.

It is a further object of the invention to construct the parts of the machine by simple and inexpensive operations, such as punch press and screw-machine operations, and to so construct and relate the parts in the assembled machine, that close fits and small tolerances are avoided, thereby avoiding expensive workmanship and expense in assembling the machine, and all without sacrificing accuracy of operation and effectiveness in use, to the end that the entire cost of production may be relatively low and the demand for the machine may be large.

The above and other objects of the invention will more fully appear and be better understood by reference to the accompanying drawings illustrating a preferred embodiment of the invention, in which Fig. 1 is a side elevation of the complete adding machine to a reduced scale, Fig. 2 is a front end elevation of the complete adding machine to a reduced scale, Fig. 3 is a full-size plan view of the machine with the casing removed, Fig. 4 is a vertical, sectional view of the structure shown in Fig. 3 taken along the line 4—4 in the latter figure, Fig. 5 is a vertical, sectional view of the structure shown in Fig. 3 taken along the line 5—5 in the latter figure, Fig. 6 is a view similar to Fig. 5 of a part of the structure therein, with the spring detent supporting bar in its alternate position.

Fig. 7 is a vertical, sectional view of the structure shown in Fig. 3 taken along the line 7—7 in the latter figure, Fig. 8 is a horizontal and inclined sectional view of the structure shown in Fig. 7 taken along the line 8—8 in the latter figure.

Fig. 9 is a view similar to Fig. 8 with the clutch members thereof and their operating devices in an alternate position, Fig. 10 is a view similar to Fig. 8 with its clutch operating cam in its position of backward movement, Fig. 11 is a vertical, sectional view of a part of the structure shown in Fig. 8 taken along the line 11—11 in the latter figure, and shows one of the transfer gears in front elevation, Fig. 12 is an inclined sectional view of the gear shown in Fig. 11 taken along the line 12—12 in the latter figure, Fig. 13 is vertical sectional view of a part of the structure shown in Fig. 9 taken along the line 13—13 in the latter figure, and shows one of the totalizer ratchet wheels in front elevation, Fig. 14 is a horizontal, sectional view of a part of the structure shown in Fig. 4 taken along the line 14—14 in the latter figure and shows the main operating shafts of the machine.

Fig. 15 is an inclined sectional view of a part of the structure shown in Fig. 4 taken along the line 15—15 in the latter figure, and shows the clutch operating shaft and the shaft supporting the totalizer wheels and the transfer gears, Fig. 16 is a vertical, axial, sectional view to an enlarged scale through one of the totalizer wheel assemblies, Fig. 17 is a right hand end elevation of the structure shown in Fig. 16, Fig. 18 shows in a view similar to Fig. 17, a right hand end elevation of the body portion of the totalizer wheel shown in Fig. 16, with the ratchet wheel, hub and internal plate and pawl removed, Fig. 19 is a right hand end elevation of the wheel hub shown in Fig. 16, Fig. 20 is a left hand end elevation of the internal plate and pawl shown in Fig. 16, Fig. 21 is a vertical, sectional view of a part of the structure of Fig. 3 taken along the line 21—21 in the latter figure, and shows the carry-over devices of the machine in side elevation with the carry-over slide in its fully retracted position, Fig. 22 is a view similar to Fig. 21 and shows the trigger latch in its slide-releasing position, and the slide moved forwardly a small amount and still held by its timing latch, Fig. 23 is a view similar to Figs. 21 and 22 and shows the timing latch withdrawn from slide-holding engagement, and the slide in its carry-over position, Fig. 24 is a vertical, sectional view of a part of the structure shown in Fig. 3 taken along the line 24—24 in the latter figure, and shows a portion of the carry-over mechanism illustrated in Fig. 21, with the trigger latch in its position of rest and with the carry-over slide in the position shown in Fig. 21, Fig. 25 is a view similar to Fig. 24 and shows the trigger latch in its fully raised position by the totalizer wheel of next lower order, the carry-over slide being shown in this view in its position of slight forward movement permitted by the timing latch in its holding position as shown in Fig. 22, Fig. 26 is a view similar to Figs. 24 and 25 and shows the totalizer wheel of next lower order in its "0" position releasing the trigger latch, and also shows the carry-over slide in its forward or carry-over position permitted by the releasing position of the timing latch shown in Fig. 23

Fig. 27 is a vertical, sectional view of a part of the structure shown in Fig. 3 taken along the line 27—27 in the latter figure, and shows the means employed for controlling the resetting of the totalizer wheels, Fig. 28 is a vertical, sectional view of a part of the structure shown in Fig. 14 taken along the line 28—28 in the latter figure, Fig. 29 is a vertical, sectional view of a part of the structure shown in Fig. 14 taken along the line 29—29 in the latter figure, Fig. 30 shows in end elevation the inner end of the hub portion of the operating handle removed from the operating shaft shown in Fig. 14, Fig. 31 shows in right hand end elevation, the full stroke mechanism and hub portion of the operating handle employed in connection with the operating shaft and shown in part in horizontal sectional view and in place on said shaft in Fig. 14, Fig. 32 is a vertical, sectional view of the structure shown in Fig. 4, taken along the line 32—32 in the latter figure, Fig. 33 shows in a view similar to Fig. 32, a modified form of clutch mechanism between the transfer gear and the totalizer wheel shown in Fig. 32.

Figs. 34 and 35 are vertical, sectional views of the structure shown in Fig. 33, taken respectively along the lines 34—34 and 35—35 in the latter figure, Fig. 36 is a vertical, sectional view of a part of the structure shown in Fig. 3 taken along the line 36—36 in the latter figure, and Fig. 37 is a vertical, sectional view to an enlarged scale, of a part of the structure shown in Fig. 1, taken along the line 37—37 in the latter figure.

Similar numerals refer to similar parts throughout the several views.

The adding machine of the invention includes a framework comprising vertical, parallel and equally spaced partitions 2 to 8 inclusive (Fig. 3), of sheet metal, forming compartments I to VI between them, and vertical end plates 1 and 9 of sheet metal parallel with and spaced from the adjacent partitions 2 and 8 respectively. Said partitions and end plates extend from front to rear of the machine, and are held together by tie rods 10 to 14 inclusive (Figs. 3, 4 and 36), extending through said partitions and end plates and carrying spacing sleeves 15 to 19 of metal between said partitions and end plates, by which said partitions and end plates are rigidly and securely held together to constitute the framework of the machine, by end screws engaging said tie rods.

Each of the compartments I to VI contains a totalizer wheel 20 and attached ratchet wheel 21 and a transfer gear 22, which parts are mounted for rotary movement on a common supporting shaft 23 (Fig. 3), extending with a sliding fit through the partitions 2-8 inclusive; each of said compartments also contains set-up devices including an oscillatory finger 24 adjacent a curved index plate 25 for setting up each amount to be transferred and added to the total shown by the totalizer wheels 20; said compartments I to VI inclusive thus correspond to the orders of units involved in the machine, being respectively from right to left of the machine, units, tens, hundreds, thousands, tens of thousands and hundreds of thousands, the capacity of the illustrative machine being 999,999.

Each of the compartments II to VI inclusive also contains carry-over mechanism of the delayed action type, including an operating slide 26, a trigger latch 27 and a timing latch 28 (Fig. 3), for advancing the totalizer wheel 20 of that order one unit as a result of the totalizer wheel of the next lower order being rotated from its "9" to its "0" position. Many of the parts in the several compartments are duplicates of each other and are respectively referred to by the same reference numerals where confusion does not result from so doing; for example, the finger 24 may if unmodified, refer to said finger in any of the compartments, since the set-up mechanism in each compartment is the same as in each other compartment. If, however, for clarity, it is necessary to identify such a part in a particular compartment, for example, the finger 24 in compartment I, that effect is secured herein by designating said finger as finger 24—I. Similarly, where the carry-over operation in compartment II is discussed (Figs. 4, 21), the carry-over operation is initiated by totalizer wheel 20—I being turned from its "9" to its "0" position, which moves trigger latch 27—II from holding engagement with slide 26—II and transfers control of said slide, but not its complete release, to timing latch 28—II, which condition continues until just before the main operating handle 35 reaches the end of its operating cycle, at which time the timing latch 28—II is moved from engagement with slide 26—II and the latter under the action of its operating spring moves forwardly and advances the totalizer wheel 20—II one unit or step, thus delaying the carry-over operation of the totalizer wheel 20—II until the end of the operating cycle of the main handle 35.

As shown in Figs. 1 and 2, the machine is provided with a casing 29 of suitable material, for example, sheet metal or plastic, which has a front wall closely adjacent the index plates 25 and totalizer wheels 20, which wall is provided with a lower sight opening 30 disclosing all of the numerical indications on the index plates 25, provided as an aid in effecting any desired set-up of the fingers 24 extending through said opening 30.

As shown in Figs. 2 and 3, each index plate 25 is provided with a sight opening 31 disclosing an indicator 32 operated by the finger 24 and carrying digits showing at any time through said opening 31 a digit corresponding to the set-up position of said finger. The fingers 24 and index plates 25 together constitute the keyboard of the machine.

Above the sight opening 30, the front wall of the casing 29 is provided with individual sight openings 33 extending across the casing and showing by means of numerals on the outer surfaces of the totalizer wheels 20, the total value of any desired series of items or amounts successively transferred to said wheels for corresponding items of set-up, and also showing after resetting said wheels following a desired summation, the "0" or cleared condition of said wheels. A resetting knob 34 having a hub extending through a clearance opening in the casing for connection with the rod 23, is provided to reset the wheels 20 to their "0" condition. A main operating handle 35 having a hub 36 extending through a clearance opening in the casing 29 for connection with the main operating shaft of the machine, is provided to effect after each set-up, a transfer of said set-up to the totalizer wheels 20, to clear the keyboard and restore the fingers 24 to their "0" positions, and to control the operation of the carry-over devices.

As shown in Fig. 37, the casing 29 fits closely around a base 37 to which it is secured by screws 38 as indicated. The base 37 is enough wider than the over-all width of the framework outside of the end plates 1 and 9, to support blocks or lugs 39 adjacent said end plates, which blocks are secured to the base by screws 40 as indicated. A front retaining rod 41 extends with a sliding fit through the blocks 39 and also through holes 42 therefor through the end plates 1 and 9 and through the partitions 2 to 8 inclusive to connect the framework with the base. A similar rod extends through similar blocks and also through the end plates and partitions to connect the rear portion of the framework with the base.

As shown in Fig. 14, the main operating shaft 43 of the machine is supported by end bearings 44 and 45 rigidly secured to the end plates 1 and 9. The shaft is of square cross-section excepting at its end portions, and carries arms 46 for in part controlling the carry-over mechanism, and also cams 47, 48 and 49, which arms and cams have square holes that are a sliding fit on said shaft. Tubular metal spacers 50 and 51 having a square cross-section and a sliding fit on the shaft hold the arms and cams rigidly in place on the shaft. The spacer 50 is rigidly secured to the shaft by a pin 52 and is of a length from the round end of the shaft in the bearing 45 to hold the cam 47 adjacent but slightly spaced from the outer surface of the partition 8. The spacers 51 are unsecured to the shaft and are of lengths holding the cam 48 adjacent and slightly spaced from the right hand side of the partition 5 and holding the cam 49 a small distance to the right from the middle of the compartment I; said spacers 51 also hold the arms 46 in similar positions in the compartments II to VI inclusive, each in a position somewhat to the left of the middle of the compartment containing it. The shaft 43 extends with square cross-section a substantial distance to the right of the cam 49, and said square extension enters an end keyway 53 in a cylindrical connector 54, which keyway has a width closely fitting the opposite flat surfaces of said extension and a depth somewhat greater than the length of said square extension. The right hand portion of the connector 54 is turned down and shouldered to turn freely in the bearing 44 and to prevent objectionable end play of the shaft in its bearings. Outside of its square extension, the shaft 43 is turned down to a diameter substantially equal to its dimension across its flat surfaces, and this cylindrical end portion 55 extends a substantial distance outside of the outer surface of the end wall 1 and is externally threaded. The outer end of the bearing 44 extends a small amount outside of the outer surface of the end wall 1, and the outer end of the cylindrical portion of the connector 54 is substantially flush with the outer end of the bearing 44. The connector 54 has a bore extending from its keyway 53 which closely fits the extension 55, and outside of its cylindrical end, said connector is provided with opposite end keys 56 closely fitting opposite keyways 57 in a full-stroke plate 58 mounted on the extension 55 (Fig. 29). Between the keyways 57, the plate 58 is provided with a second pair of opposite keyways 59 fitting end keys 60 extending from the hub 36 of the handle 35. Fig. 28 is a left hand elevational view of the connector 54 removed from the shaft 43. In Fig. 29, the handle 35 is removed to more clearly show the keyways 59. Fig. 30 is a left hand elevational view of the handle hub 36 removed from the machine to more clearly show the end keys 60.

The hub 36 is provided with a bore substantially larger in diameter than the extension 55, to receive with a sliding fit a tubular extension 61 from a knurled head 62, which extension 61 is internally threaded to engage the external threads on the extension 55. The head 62 is shouldered as indicated and when screwed onto the extension 55, holds the hub 36 tightly against the plate 58 and also holds the plate 58 tightly against the end of the connector 54.

In assembling the shaft 43 and its parts, the spacer 50 is secured to the shaft by the pin 52, the spacers 51, arms 46, and cams 47, 48 and 49 are placed on the shaft as indicated and described, and then the connector 54 is placed on the extension 55, and with the connector tightly pressed towards the spacer 50, a pin 63 is inserted through the connector and through the shaft end in the keyway 53, thereby rigidly securing the arms 46 and the cams to the shaft. The lower right hand corners of the partitions 2 to 8 inclusive are cut away (Fig. 4), so that the shaft 43 and its parts may be assembled as a unit and then as such be placed in the bearings 44 and 45.

As also shown in Fig. 14, the machine is provided with a second square shaft 64 parallel with and in front of the shaft 43, and having turned ends for support by bearings 65 and 66 extending through and rigidly secured respectively to partitions 8 and 2. Sector resetting arms 67 spaced from each other and located respectively in compartments I to VI inclusive, and provided with square holes that are a sliding fit on the shaft 64, are mounted on said shaft, each in the right hand portion of the corresponding compartment, and said shaft also carries in the same manner, an operating arm 68 cooperating with the cam 49 (Fig. 4). The arms 67 and 68 are held in spaced relation by square tubular spacers 69 that are a sliding fit on the shaft 64. The right hand resetting arm 67 is held against movement to the right by a pin 70 extending through the shaft 64 and against which pin said arm rests, and the arms and spacers are held in a tightly pressed condition against each other, by a pin 71 extending through the left hand spacer and also through the shaft 64. The lower portions of the partitions 3 to 7 inclusive are provided with clearance slots (Fig. 4), so the shaft 64 and its parts may first be assembled as a unit and then as such be placed in the bearings 65 and 66.

Fig. 15 illustrates the assembly of totalizer wheels 20 and ratchet wheels 21, and transfer gears 22 on shaft 23, and also the clutch mechanism controlling the operation of the totalizer wheels by the transfer gears. Each totalizer wheel 20 and attached ratchet wheel 21 combination is mounted on a bushing 72 which is a sliding fit on the shaft 23. The shaft 23 also carries in the same compartment containing the totalizer wheel and ratchet wheel combination, a thin walled, tubular spacer 73 extending with a free fit axially, from the bushing 72 to the right hand partition of said compartment, to hold the totalizer wheel adjacent the left hand partition of said compartment. The transfer gear 22 in said compartment, is mounted on a grooved hub 74 having a bore that is a sliding fit on the spacer 73, said hub having a length axially permitting sufficient axial movement of the hub to the left on the spacer 73, to move a clutch pin 75 carried by the transfer gear, into one of the holes 76 in the web of the ratchet wheel 21 with which said pin 75 may be in alignment, said ratchet wheel thereby comprising the other member of the clutch mechanism. With the clutch members thus engaging each other, the totalizer wheel and ratchet wheel combination and the transfer gear are positively connected and must rotate as a unit, if rotary movement is imparted to any one of the parts of said unit, and there is no possibility of angular movement in either direction of any one of said parts relatively to any other one of the parts of said unit, and the extent of angular movement of any part of said unit cannot be different from the extent of angular movement of any other part of said unit. Axial movement of the hub 74 to the right on the spacer 73, removes the clutch pin 75 from engagement with the ratchet wheel 21, and at the same time provides a sufficient clearance space between said pin 75 and said ratchet wheel to prevent accidental contact of the clutch pin with the ratchet wheel; for this open condition of the clutch mechanism, either the transfer gear 22 or the totalizer wheel and ratchet wheel combination may be freely rotated independently of the other, with no possibility of communicating rotary movement of any kind or amount to the other.

As shown in Fig. 15, the right hand end of the shaft 23 has rigidly secured to it between the end plate 1 and the partition 2 by a pin 78, a flanged control member 79 for the resetting operation of the totalizer wheels 20, which control member has a hub 80 extending through the end plate 1 and has a stepped end fitting the stepped inner end of a hub 81 extending from the resetting knob 34 with a sliding fit on the end portion of the shaft 23. A screw 82 threaded into the end of the shaft 23 holds the inner end of the hub 81 tightly against the hub 80, whereby resetting movement may be imparted to the shaft 23 by turning the knob 34, the knob 34 being readily removable from the shaft 23 for assembling and removing the casing 29, by removing the screw 82. The shaft 23 is provided with a small longitudinal keyway 83 extending through all of the totalizer wheels 20 to effect a resetting operation of said totalizer wheels by rotation of the knob 34.

As shown in Fig. 15, the groove in each of the hubs 74, is engaged by the forward end of a clutch operating plate 84 mounted at its rear portion on a square shaft 85 parallel with the shaft 23 and having turned end portions engaging with a sliding fit, bearings 86 and 87 rigidly supported by end wall 9 and partition 2 respectively. The plates 84 are provided with square holes that are sliding fits on the shaft 85, and said plates are held each in a similar position in the right hand portion of the compartment containing it, by square tubular spacers 88 on the shaft between said plates, which spacers and plates are held in a tightly pressed condition against each other by pins 89 extending through said shaft, thereby rigidly holding said plates in parallel spaced relation extending in the same direction from the shaft. A guide rod 90 extends with a sliding fit through the plates 84 and also through the partitions 2 to 8 inclusive but not through the end plates 1 and 9, the ends of said rod being adjacent the inner surfaces of said end plates to hold the rod in place without the use of fastening devices of any kind, which simplifies and cheapens the construction and also the assembly of the parts. The guide rod 90 prevents angular movement of the plates 84 and shaft 85 around the axis of said shaft, but permits free movement of said plates and shaft as a unit, axially of said shaft, which axial movement is employed to simultaneously move the clutch pins 75 to their closed or clutching positions in the holes 76, which movement is limited by engagement of the transfer gears 22 with the ratchet wheels 21, and to simultaneously move the clutch pins 75 to their open or unclutched positions free from the holes 76, which movement is limited by engagement of the hubs 74 with the partitions 2 to 7 inclusive. The shaft 85 at its left hand portion is turned down and is a sliding fit in the partition 8 and outside of said partition is provided with an operating pin 91 extending through said shaft with its ends extending outside of said shaft, to impart axial movement to said shaft as below described. Outside of the pin 91, the shaft 85 is shouldered and of reduced diameter through the bearing 86, a washer 92 being carried by the shaft adjacent said shoulder, and between said washer and the bearing 86, a compression spring 93 is mounted around the shaft, which spring is of such strength as to positively move the shaft 85 to the right to its extreme unclutching position when the pin 91 is free from actuating force moving said shaft to the left to its clutching position. A clearance opening 121 is provided through each of the partitions 3 to 7 inclusive around the shaft 85, permitting the mounting of said shaft in its bearings 86 and 87, after assembling the plates 84 on said shaft as described.

The totalizer wheels 20 are preferably constructed as shown in enlarged scale views in Figs. 16 to 20 inclusive. Each of said wheels includes a unitary rim, web and hub structure of molded material, for example, metallic alloy or plastic, having a bore fitting the outer cylindrical surface of a metallic bushing 72, said hub having in its right hand end a circular recess 94 having a flat upper surface (Fig. 18), in which recess a flange 95 of similar form and size on the bushing 72 (Fig. 19), fits when the parts are assembled as shown in Fig. 16. The ratchet wheel 21 is of formed sheet metal having a web provided with a bore fitting the end portion of the bushing 72 just outside of the flange 95, so that the ratchet wheel web and the bushing flange engage each other for the assembled condition of the wheel. The ratchet wheel web around its circular outer edge is provided with integral and equally spaced teeth, equal in number to the number of indicating digits carried by the rim of the totalizer wheel, for example ten teeth, there being ten equally spaced indicating digits shown herein as carried by said rim, although obviously a multiple of that number may be employed if preferred; said teeth extend perpendicularly from the ratchet wheel web towards the web of the totalizer wheel, and at their left hand ends extend into shallow seats 96 therefor (Fig. 18), to afford stable support for said teeth ends when the parts are assembled as shown in Fig. 16. The ratchet wheel web is provided with equally spaced clutch holes 76 in a circular arrangement having the same radius as the radial distance of the axis of the clutch pins 75 (Fig. 15) from the axis of the shaft 23, said holes being the same in number as the number of indicating digits carried by the rim of the totalizer wheel, for example, ten of said holes (Fig. 17), for the illustrative structure shown in the drawings. Said holes are each of slightly larger diameter than the diameter of the clutch pins 75 cooperating therewith, and the outer ends of said pins are preferably rounded or chamfered to insure certain and easy entrance of said clutch pins into any of said holes with which they may be in alignment, during any clutching operation.

The inner wall of the web of the totalizer wheel 20 has resting against it and supports a metal disk 97 which is circular excepting for a cut-out portion 97a (Fig. 20). Said disk has a bore fitting the bushing 72 and has an external diameter slightly smaller than the inside diameter of the rim of the totalizer wheel. Said disk 97 has pivotally secured thereto at 98, a small pawl 99 having a pointed inner end projecting into the bore in the disk and through a slot 100 therefor in the bushing 72 and into the bore in said bushing, under the action of a tension spring 101 connecting the pawl with a lug 102 projecting from the disk, excepting when the inner end of said pawl is prevented from projecting into the bore in the bushing 72 by the shaft 23 in said bushing. The totalizer wheel 20, ratchet wheel 21, bushing 72 and disk 97 are held securely together in the assembled condition shown in Figs. 16 and 17 by rivets 103 extending through said parts. As a result of the structure described, with the structure of Figs. 16 and 17 mounted on the shaft 23, and viewing the structure from the left hand end of said shaft, the counter clockwise rotation of the totalizer wheels required in totaling several items is freely permitted without angular movement of the shaft 23, whereas when it is desired to reset the totalizer wheels to their "0" condition, counter clockwise rotation of the shaft 23 in the manner below described, engages the pawls 99 in the keyway 83 in the shaft 23 and rotates all of the totalizer wheels not in their "0" condition, until they reach that condition. The cut out portion of the disk 97 is provided with a formed cam 104 extending perpendicularly therefrom to initiate carry-over operations as below described.

As shown in Figs. 11 and 12, the clutch pin 75 is preferably a sliding fit in a hole therefor in the transfer gear 22 and at its inner end is rigidly secured to the midportion of a flat arcuate spring 105 held under tension against the gear 22 by rivets 106 through the ends of said spring. The spring 105 holds the clutch pin 75 in the position shown in Fig. 12, unless by accident said pin is not in alignment with one of the clutch holes 76 in the ratchet wheel 21 (Fig. 13), when the transfer gear 22 is moved towards the ratchet wheel during a clutching operation, in which case the spring 105 will yield and prevent damage to the parts that might otherwise occur.

In Figs. 33 to 35 inclusive, a modified construction of the clutching devices is shown, in which the clutch pin is carried by the ratchet wheel and the clutch holes are in the transfer gear, the construction being the reverse of that above described in connection with Fig. 15, but operating in an equivalent manner to produce the same results. In this modified construction, the totalizer wheel 20 is of the same construction and operates in the same manner above described, and the ratchet wheel 21a is of the same form as and is secured to the totalizer wheel 20 in the same manner as above described, but in this case the ratchet wheel carries a clutch pin 75a extending through the web of the ratchet wheel with a sliding fit and secured thereto by an arcuate flat spring 105a having its ends riveted to the web of the ratchet wheel at 106a. In this modified construction, the transfer gear 22a is provided with a circular row of equally spaced clutch holes 76a having the same number, arrangement and purpose as the clutch holes 76 above described in the web of the ratchet wheel 21. This modified construction operates in all respects in an equivalent manner to secure the same results as above described in connection with Fig. 15.

In Fig. 7, the cam 47 is shown engaged by a roller 107 carried by a flat bar 108 extending upwardly and forwardly on the outer surface of the partition 8 to operate the clutch shaft 85 axially. The upper portion of the bar 108 is held adjacent the partition by a shouldered screw 109, the lower portion of said bar being held in that position by being located in a small clearance space provided between the partition and the cam 47 (Fig. 14). Transverse movement of the upper portion of the bar 108 on the partition is prevented by a longitudinal slot 110 in said bar containing the body portion of the screw 109 with a sliding fit, and transverse movement of the lower portion of said bar is prevented by a roller 111 carried by said bar entering with a free rolling fit, a slot 112 in the partition 8 parallel with the slot 110. The parts described are so related that the central line of the bar 108 extends substantially through the axis of the clutch shaft 85, and that the bar is capable of only longitudinal movement towards and from said shaft 85, a spring 113 being provided having its upper end anchored in the partition 8 and encircling a lug 114 formed from the partition, and pressing at its lower end against a bent lug 115 formed from the bar 108, to at all times firmly hold the roller 107 against the cam 47. At its upper end, the bar 108 is provided with parallel flange members 116 extending perpendicularly and outwardly from said bar, through which a short pivot rod 117 extends, having end pins 118 holding it in place. The pivot rod 117 extends through parallel ears 119 extending outside of and adjacent the flange members 116, which ears are formed from a lifting cam 120 having a body portion 122 parallel with and substantially spaced from the partition 8, and an inclined outer end portion 123 extending towards and terminating at its end closely adjacent to the partition 8. A spring 130 around the pivot rod 117, holds the outer end of the cam 120 adjacent the partition 8 unless said cam is moved away from said partition against the action of said spring.

The inclined end portion 123 of the lifting cam is centrally slotted at 124, the width of said slot being sufficient to freely receive the cylindrical portion of the shaft 85 adjacent the pin 91, but substantially less than the over-all length of said pin 91. The slot 124 extends a short distance into the body portion 122 of the cam 120, where it opens into a cross slot 125 in said body portion that has a width greater than the diameter of the pin 91, and a length substantially greater than the over-all length of said pin 91. The pin 91 extends through the shaft 85 in a direction crossing the slot 124 perpendicularly, and parallel with the cross slot 125.

As more fully explained below, the clutching operation between the clutch pins and holes therefor, must occur during the first part of the forward stroke of each operating cycle of the handle 35. Each forward stroke of said handle is substantially 105 degrees of movement, as is each back stroke, and as below described, full stroke mechanism is provided requiring the handle to be moved from its back position or position of rest, through its complete forward stroke before its back stroke can be begun, and then requiring it to be moved through its complete back stroke to its back position or position of rest thereby completing a cycle of operation, where a yielding spring holds the handle against accidental forward movement, without interferring with the next cycle of operating movement of the handle, when the same is desired.

As shown in Fig. 7, when a cycle of forward movement of the handle 35 is begun, the cam 47 begins its rotary movement in the direction of the arrow, and begins the movement of the bar 108 towards the shaft 85 by the rising surface 126 on said cam. At the start, the lifting cam 120 has the relation to the shaft 85 and pin 91 shown in Fig. 8 and the pin 75 and ratchet wheel 21 are in their unclutched position. Rotation of the cam 47 moves the bar 108 in the direction of the arrow (Fig. 8), until the end of the rising surface 126 is under the roller 107 (Fig. 7), at which time the inclined portion 123 of the lifting cam 120 has passed completely under the pin 91, moving the shaft 85 axially against the action of its returning spring 93 to its position effecting complete clutching between the transfer gear 22 and the ratchet wheel 21, and at the same time placing the pin 91 on the body portion 122 of the lifting cam, but with the lifting cam not sufficiently moved under the pin 91 to bring the latter into alignment with the cross slot 125 (Fig. 9). This relation of the parts, effected by the rising surface 126 of the cam 47 and shown in Fig. 9, is continued for a substantial angular movement of the cam 47 by a delay surface 127 thereof, to permit other operations below described, to be effected by rotary movement of the shaft 43 during the delay interval. The movement of the shaft 85 from its position shown in Fig. 8 to its position shown in Fig. 9, is effected by substantially the first 30 degrees of forward movement of the handle 35 from its back position, and the delay interval represented by the delay surface 127 of the cam 47, comprises substantially the next 60 degrees of forward movement of the handle 35. At the end of the delay surface 127 of the cam 47, a second rising surface 128 of said cam engages the roller 107 and in substantially 5 degrees of angular movement of said cam, moves the lifting cam 120 enough further under the pin 91 to bring said pin into alignment with the cross slot 125, and the spring 93 at once moves the shaft 85 and parts carried thereby to their unclutched position shown in Fig. 8, at which time, however, the lifting cam 120 is still in its position of maximum forward movement, which condition is continued until the end of the forward stroke of the handle 35, by a second delay surface 129 on the cam 47.

The following back stroke of the handle 35 produces an operation of the bar 108 that is the reverse of that described for the forward stroke, but inasmuch as it is desired that the back stroke shall have no effect on the clutching mechanism described, that result is secured as follows. The lifting cam 120 is held with its outer end adjacent the partition 8, by a spring 130. At the beginning of the back movement of the bar 108 by its spring 113, the pin 91 is between the lifting cam 120 and the partition 8. As the bar 108 moves backward as indicated by the arrow in Fig. 10, the inclined end portion 123 of the lifting cam 120 engages the pin 91 and is lifted thereby against the action of the spring 130 as indicated in Fig. 10, and for continued back movement of the bar 108, the lifting cam 120 is freed from the pin 91, and the spring 130 moves the outer end of the lifting cam to a position adjacent the partition 8 ready for its next forward movement.

In Fig. 4, the sector set-up mechanism is shown in the lower portion of said figure together with the sector resetting and transfer mechanism located in compartment I, and in the upper part of said figure the carry-over mechanism located in compartment II is illustrated.

As shown in Fig. 4, a sheet metal sector 131 is mounted for rotation on a rod 132, which extends with a sliding fit through partitions 2 to 8 inclusive but not through the end plates 1 and 9, in the same manner above described for the guide rod 90. As shown in Fig. 32, the sector 131 is rigidly mounted on a bushing 133 having extensions ending adjacent the partitions 2 and 3, by which the sector is maintained in the position indicated in Fig. 32, between said partitions, which bushing is a sliding fit on the rod 132. The upper circular edge of the sector is closely adjacent a corresponding index plate 25 not shown in Fig. 4, and is provided with gear teeth 134 meshing with the teeth of a pinion 135 mounted for free rotation on a rod 136, which pinion is also in mesh with a corresponding transfer gear 22. The rod 136 extends with a sliding fit through partitions 2 to 8 inclusive, but not through the end plates 1 and 9, in the manner above described for the rod 90. The pinion 135 is maintained in the position in compartment I shown in Fig. 32, by tubular spacers 137 on said rod, for which position the right hand end of the pinion is substantially in line with the right hand face of the sector 131 and also with the right hand face of the transfer gear 22 when the latter is in its extreme unclutching position shown in Fig. 32. The pinion 135 has an axial length maintaining it in mesh with the transfer gear 22 when the latter is moved to its extreme clutching position shown in Fig. 9.

As shown in Fig. 4, the finger 24 is provided with an angular offset 24a in line with the teeth 134, secured to and forming a support for the arcuate indicator strip 32, and further support for the latter is provided by an angle member 138 secured to the sector 131 and also secured to said strip 32.

As shown in Fig. 4, the lower portion of the sector 131 has a circular edge of smaller radius than the teeth 134, provided with V-shaped notches 139 for cooperation with a spring detent 140 rigidly secured to a supporting bar 141, to yieldingly hold the sector in any position it may be given in making a set-up by movement of the finger 24, the angular spacing of the notches 139 being the same as the angular spacing of the digits on the indicator strip 32 and also proportional to the angular spacing of the digits on the totalizer wheel 20 (Fig. 32) and of the clutch holes 76 in the ratchet wheel 21. The sector and pinion construction described is duplicated in each of the compartments II to VI inclusive, and the bar 141 extends through all of said compartments and is supported for a small amount of angular movement on a rod 142 extending with a sliding fit through partitions 2 to 8 inclusive in the manner described for the rod 90. The bar 141 is provided with spaced ears 143 adjacent desired ones of the partitions, which ears are provided with holes receiving the rod 142 with a sliding fit, and springs 144 are provided between the right hand edge of said bar 141 and desired ones of said partitions to press the detents 140 against the sectors with sufficient force to insure holding the sectors effectively in positions given them in making any set-up of the fingers 24.

As shown in Figs. 3 and 21 each ratchet wheel 21 cooperates with a spring actuated detent 145 of formed sheet metal, mounted with a sliding fit on a supporting rod 146 extending with a sliding fit through holes therefor in partitions 3 to 8 inclusive in the manner above described for the rod 90, excepting that the rod 146 has its ends adjacent partition 2 and end plate 9. Each detent 145 is held in position in its compartment by a formed spacing lug 147 extending to the right from the detent and ending adjacent the partition between it and the next compartment, and a spring 148 is provided holding each detent 145 yieldingly but firmly against the corresponding ratchet wheel 21.

It will be observed that during movement of the fingers 24 to effect a desired keyboard set-up, there is no operating engagement of any kind between the transfer gears 22 and the totalizer wheels 20 because of the open condition of the clutching devices; thus the transfer gears may be rotated to suit the operator by movement of the fingers 24 in either direction, and the setting of the fingers is accurately indicated by the digits on the indicator strips 32 that appear through the sight openings 31 in the index plates 25 (Fig. 2). Furthermore, in effecting said keyboard set-up, the clutch pins 75 carried by the transfer gears 22, are obliged to move angularly to an extent having a fixed ratio to the angular movement of the fingers 24, because of the sectors 131 being positively geared to the transfer gears 22 at all times, as a result of which when any keyboard set-up has been completed, each clutch pin 75 definitely and positively must have an angular position relatively to its "0" position, and be spaced therefrom the same number of angular units (each of which is 36° in the illustrative machine of the drawings), as represented and called for by the digit appearing in the corresponding sight opening 31. The parts are so proportioned and adjusted, that for each holding position of each ratchet wheel 21 by its detent 145, one of the digits on the attached totalizer wheel 20 is centered in the corresponding sight opening 33 in the casing 29, that for each holding position of each sector 131 by its detent 140, one of the digits on the attached indicator strip 32 is centered in the corresponding sight opening 31 in the corresponding index plate 25, and that for each of said holding positions of each ratchet wheel and each sector cooperating therewith, the clutch pin 75 associated with said sector is in axial alignment with one of the clutch holes 76 in the cooperating ratchet wheel.

When a keyboard set-up has been effected as above described, the handle 35 is moved through its cycle of operation, and with it the main operating shaft 43. As shown in Fig. 4, the cam 49 has resting against it under the action of a spring 149, a roller 150 carried by the operating arm 68 on the sector resetting shaft 64. One of the resetting arms 67 is connected with one end of the spring 149, the other end of which spring engages the tie rod 14. Each resetting arm 67 extends to the left from the shaft 64 over and in line with a roller stud 151 carried by the sector 131, which stud 151 is angularly spaced from the arm 67 so that when the sector is moved to its "9" position, said stud 151 is close to but slightly spaced from the arm 67. The first part of the surface of the cam 49 engaging the roller 150, is a delay surface 152, of about 45 degrees in extent, during which interval there is no movement of the arm 67, but by which an ample interval is provided so that somewhat less than that amount of forward movement of the handle 35, completes the movement of the transfer gears 22 axially into engagement with the ratchet wheels 21 and establishes the clutch relation between said transfer gears and said ratchet wheels in the manner above described in connection with Figs. 7 to 10 inclusive. Thus at the end of the delay interval 152 of the cam 49, the transfer gears 22 are securely clutched and locked against rotation relatively to the ratchet wheels 21 and attached totalizer wheels 20, which clutching occurs entirely by axial movement of the transfer gears 22 and this produces no tendency of any kind to displace the set-up sectors 131 from the positions in which they are held by the detents 140, or to displace the totalizer wheels 20 and ratchet wheels 21 from the positions in which they are then held by the detents 145. Following the delay surface 152, the cam 49 is provided with a rising surface 153 of about 45 degrees in extent and of sufficient rise to move the arm 67 through an angle that will move the sector 131 from whatever its set-up position may be, back to its "0" position shown in Fig. 4, if the sector were moved from said position to effect the set-up. Because of the clutched condition referred to, of all of the transfer gears with the corresponding ratchet wheels, the resetting of the sectors 131 to their "0" position positively rotates or advances the totalizer wheels 20, each by the number of units of the set-up of the corresponding sector.

A stop rod 154 extends through partitions 2 to 8 inclusive with a sliding fit and also through a clearance opening 154a therefor in the sector 131, said opening 154a having an angular extend such that one of its edges engages said rod when the sector is moved to its "9" position, and that an opposite edge of said opening engages said rod when the sector is moved back to its "0" position, said rod 154 being held in place as above described for the rod 90. Following the rise 153, the cam 49 is provided with a second delay surface 155 permitting continued movement of the handle 35 to the end of its forward stroke without further movement of the shaft 64 and arms 67. During the back stroke of the handle 35, the spring 149 raises the arms 67 to their original position of rest without movement of any kind of the sectors 131, freeing said sectors for the next keyboard set-up operation as far as the arms 67 are concerned.

A stop rod 156 limiting movement of the cam 49 and shaft 43 in each direction, extends with a sliding fit through partitions 2 to 8 inclusive and is held in place as described for the rod 90. After the transfer operation of the set-up amount from the sectors 131 to the totalizer wheels 20 effected by returning the sectors 131 to their "0" positions by the rise 153 of the cam 49, and while the arms 67 are still in their positions holding the sectors 131 in their "0" positions by the action of the delay surface 155, when about 5° of said delay surface has passed under the roller 150, the second rise 128 of the cam 47 has moved the bar 108 sufficiently to release the pin 91 from the lifting cam 120, thus insuring that the sectors 131 shall be fully returned to their "0" positions before the clutching mechanism between the transfer gears 22 and the ratchet wheels 21 is released and the transfer gears 22 are moved to their positions indicated in Fig. 8.

It will be observed that during the resetting of the sectors 131 to their "0" positions, conditions may readily develop where all of the sectors must be simultaneously reset against the resistance of all of the sector detents 140 and all of the totalizer detents 145, thereby placing a heavy load on the handle 35, unless means are provided to decrease that load. In view of the transfer gears 22 being positively clutched to the ratchet wheels 21 during the resetting of the sectors 131, the totalizer detents 145 can be relied upon during that interval to not only prevent accidental displacement of the totalizer wheels 20, but also of the sectors 131, thus permitting substantially decreasing the handle load represented by the sector detents 140, as illustrated in Figs. 5 and 6.

As shown in Fig. 5, the cam 48 in the compartment III has resting against it a roller 157 carried by the right hand end of a horizontally disposed flat bar 158 pivotally connected at its left hand end at 159 with the mid-portion of a lever 160 pivotally connected at its upper end at 161 with the partition 5 against which said bar 158 rests, being held flatwise against said partition in part by having its right hand end disposed between the cam 48 and said partition, and in part by its pivotal connection 159. The right hand portion of the bar is restrained against appreciable vertical movement by a roller 162 carried by said bar, engaging with a rolling fit a horizontal slot 163 in the partition 5. The lever 160 is disposed vertically above the right hand end of the sector detent 140 in compartment III, and has pivotally connected with its lower end at 164, a pawl 165 engaging a ratchet wheel 166 pivotally mounted by means of a stud 167, on the partition 5, the lower edge of said ratchet wheel 166 resting against the upper surface of the right hand edge of the bar 141 supporting all of the sector detents 140, to restrain upper movement of said right hand edge under the action of the spring or springs 144. The teeth of the ratchet wheel 166 are sufficiently large and deep, and the parts are so proportioned and positioned that when said right hand edge is between two adjacent ones of said teeth and resting against the bottom of the notch between them as shown in Fig. 5, said right hand edge is held in its uppermost position by the spring or springs 144, which have a strength sufficiently greater than all of the spring detents 140 to maintain that position of said right hand edge against the operation of any or all of said spring detents. When the ratchet wheel 166 is rotated a little less than the pitch of said teeth, so that the point of the following tooth rests on the upper surface of said right hand edge portion, the bar 141 is tilted on its supporting rod 142 around to the right a sufficient amount against the action of the spring or springs 144, to nearly or quite relieve the sector 131 of the holding action of the spring detent 140 as shown in Fig. 6. A spring 168 between the pawl 165 and the bar 158 holds the pawl in engagement with the ratchet wheel 166, and a spring 169 coiled around a post 170 extending from the partition 5, and with its upper end anchored in an opening in said partition and resting at its lower end against a bent lug 171 formed from the bar 158, holds the roller 157 firmly against the cam 48.

The first part of the operating surface of the cam 48 is a delay surface 172 of about 15 degrees in extent. This holds the bar 158 and ratchet wheel 166 in the positions shown in Fig. 5, and during the interval the cam 47 has sufficiently moved the shaft 85 so that there is substantial clutching engagement between the clutch pins 75 and the ratchet wheels 21 and control against accidental movement of the sectors 131 has been established by the pawls 145, before any weakening of the applied pressure of the spring detents 140 takes place; the delay interval 172 of the cam 48 is followed by a rise 173 of about 30 degrees of angular extent, that moves the bar 141 from the position shown in Fig. 5 to the position shown in Fig. 6, thereby nearly or quite freeing the sectors 131 from restraint by the detents 140 as above described, the clutching operation between the pins 75 and ratchet wheels 21 being completed during the first part of said rise, and the movement of the detents 140 to the positions indicated in Fig. 6 being completed at the end of said rise 173; following the rise 173, the cam 48 is provided with a second delay surface 174 of substantially 45 degrees in extent, holding the detents 140 in the position shown in Fig. 6 during the entire resetting movement of the sectors 131 above described as effected by the arms 67, during which entire resetting movement of the arms 67, the pins 75 and ratchet wheels 21 are held in maximum clutching engagement as above described; the second delay surface 174 of the cam 48 is followed by a second rise 175 of substantially 5 degrees in extent, which as above described, effects the movement of the ratchet wheel 166, bar 141 and detents 140 from the positions shown in Fig. 6 to the positions shown in Fig. 5; the second rise 175 of the cam 48 is followed by a third delay surface 176 to complete the forward movement of the cam 48.

It will be noted that the back rotation of the cam 47 by the back stroke of the handle 35, produces no movement whatver of the shaft 85 from its previously established unclutching position, serving only to effect the movement of the bar 108 to its initial position by the action of the spring 113; that the back rotation of the cam 48 produces no effect whatever on the detents 140, serving only to effect the movement of the bar 158 to its initial position by the action of the spring 169, thereby moving the pawl 165 to a new position of operative engagement with the ratchet wheel 166, the latter being held against back rotation by the bar 141 then serving as a holding pawl for said ratchet wheel; and that the back rotation of the cam 49 produces no effect whatever on the sectors 131, excepting to free them for effecting the next keyboard set up, said back rotation serving only to raise the arms 67 to their initial positions away from the studs 151, by the action of the spring 149.

As shown in Fig. 31, the full stroke plate 58 (Figs. 3 and 14), is provided with an upper circular edge having closely spaced shallow notches 177 therein to engage a spring actuated pawl 178 pivotally supported on a stud 179 extending outwardly from the end plate 1. The plate 58 is shown with its upper portion in its rear or initial position, further rearward movement thereof being prevented by the engagement of a radial edge 180 of the plate 58 with the stop rod 156, for which rod a recess is provided in said plate 58 so that an opposite radial edge 181 of said plate 58 engages said rod at the end of the forward stroke of the operating handle 35. The upper end of the pawl 178 is connected by a spring 182 with a stud 183 extending from the plate 1, so that when said pawl is free from the notched circular edge of the plate 58, said pawl is held in a radial line through the axis of rotation of said plate, by the tension of said spring. The pawl 178 is mounted on the end plate 1 so that its inner end is somewhat nearer the axis of rotation of the plate 58 than are the notches 177, and said inner end is provided with two spaced holding edges 184 and 185. As a result of the construction described, when the handle 35 is moved through the forward stroke of its operating cycle, the pawl 178 is swung to an inclined position with its back edge 184 in engagement with the notches 177, thereby permitting only forward movement of the handle 35 until the rear edge of the notched portion reaches the pawl. The notched portion of the plate 58 is of somewhat smaller angular extent than the angular spacing of the edges 180 and 181 from each other, as a result of which when, at the end of the forward stroke of the handle 35, the edge 181 engages the stop rod 156, the pawl 178 clears the rear edge of the notched portion of the plate 58 and moves to its radial position permitting the back stroke of the handle 35 to begin, which inclines the pawl in an opposite direction to its first inclination and engages the edge 185 with the notches 177, thereby permitting only back movement of the handle 35 until the edge 180 engages the stop rod 156, which places the handle 35 in its back position of rest and clears the pawl 178 for movement to its radial position ready for the next cycle of operation. A spring 186 around the connector 54 (Fig. 3), and having its ends engaging the cam 49 and partition 2, moves the shaft 43 and handle 35 through their back rotation and stroke, the strength of said spring being sufficient to positively overcome any forces of resistance to said back rotation and stroke that may be exerted on said shaft by the parts of the machine.

The carry-over mechanism of the machine is shown in Figs 3, 4 and 21 to 26 inclusive, which mechanism includes in each of the compartments II to VI inclusive an operating slide 26, a trigger latch 27 and a timing latch 28, and in addition, a slide resetting lever 187 (Fig. 4), for moving the associated slide 26 to its extreme rear position at the beginning of each cycle of operation of the handle 35.

As shown in the upper part of Fig. 4, for the carry-over mechanism in compartment II, the slide 26 is supported in a nearly horizontal position by front and rear parallel rods 188 and 189 each extending with a sliding fit through partitions 3 to 8 inclusive and held in place as above described for the rod 146. Each of the slides 26 is preferably of sheet metal formed into a U-shape opening upwardly with the legs of the U parallel and forming the side walls of the slide, which are provided with slots 190 and 191 receiving the rods 188 and 189 with a sliding fit and thereby affording stable support for the slide. The slots 190 and 191 are of a length permitting the maximum required longitudinal movement of the slide, and one or both of the rods 188 and 189 engage the rear ends of their said slots when the slide is moved to its extreme forward position, thereby limiting said forward movement of the slide. A spring 192 extends in the slide 26 from the rod 188 to the rear portion of the slide where it is attached to said slide to move the slide forwardly when it is released from the holding engagement of the latches 27 and 28. The front end of the slide has pivotally connected therewith at 193, a spring actuated pawl 194 in line with the lower teeth of the corresponding ratchet wheel 21 and so related to said teeth that when the slide 26 is released for a carry-over operation, the spring 192 will move the pawl a sufficient distance forwardly to advance the totalizer wheel 20 attached to the ratchet wheel 21, one unit, which for the illustrative structure is 36 degrees, in which position the slide is held by the spring 192 until the slide is moved to its reset or rear position as follows: the resetting lever 187 is preferably formed from sheet metal to have a U-shaped mounting portion through the parallel side walls of which a supporting rod 195 extends with a sliding fit, which rod also extends with a sliding fit through the partitions 3 to 8 inclusive and is retained therein in the manner described above for the rod 146. One side wall of the supporting portion of the lever 187 is extended upwardly and adjacent a side wall of the slide 26 where it is longitudinally slotted at 196 to receive with a sliding fit the projecting end portion of a stud 197 extending through and rigidly secured to the side walls of the slide. Said side wall of the lever 187 is also extended below its mounting portion and has pivotally connected therewith at 198 a spring actuated pawl 199 in the path of movement of the bent end portion 46a of the arm 46 when the latter is moved by operation of the handle 35. The arm 46 is adjacent a downwardly extending setting arm 28a of the timing latch 28 in the path of movement of a lug 46b extending laterally from the arm 46 and so related angularly to the arm 28a that the last 10 degrees of each back stroke of the handle 35 will move the latch to its slide-releasing position shown in Fig. 4 against the action of a spring 28b, and that the first 10 degrees of each forward stroke of the handle 35 will fully release the latch 28 so that its spring 28b may move it into its slide-holding position shown in Figs. 21 and 22 and hold it in that position until the last 10 degrees of the next back stroke of the handle 35. The bent end 46a of the arm 46 when in its extreme back position is spaced about 10 degrees of angular movement back of the lower end of the lever 187 with the slide 26 in its extreme forward position, and a further forward movement of the arm 46 after releasing the latch 28, of about 10 degrees is required to move the slide 26 to its extreme rear position ready for the next carry-over operation. This accomplishes three things: first, it delays the carry-over operation in connection with each cycle of operation of the handle 35, until the last few degrees of each cycle and until after all other operations effected by the handle 35 are completed; second, it insures that the timing latch 28 shall be in a position to hold the slide 26 in its reset or rear position when by the resetting operation, the slide reaches that position; and third, it insures that the slide 26 shall reach its reset position well in advance of anything occurring in the cycle of operation of the handle 35, that could require any movement or conditioning of the slide incident to storing a carry-over operation for release later in the same cycle of operation.

After the slide 26 is moved to its reset position by operation of the lever 187 as described, and the handle 35 has completed its forward stroke and is in its back stroke, when the bent end 46a reaches the lower end of the lever 187, for reasons pointed out below, the point of the pawl 199 is to a small extent in the path of said bent end, but return movement of said bent end continues without interruption or restraint, because of said pawl turning on its pivot 198 against the action of its spring until it clears the bent end 46a, when it is returned by its spring to its operating position shown in Fig. 4.

The trigger latch 27 shown in Fig. 4 is preferably formed from sheet metal into a U-shaped structure opening downwardly and pivotally supported by a rod 200 extending with a sliding fit through its side walls and also through partitions 3 to 8 inclusive and held therein in the manner above described for the rod 146. The latch 27 is in part in a higher position than the slide 26, but to one side of said slide, with the adjacent side walls of said latch and slide overlapping each other, the combined width of said latch and slide being a free fit between the partitions 3 and 4, the latch being thereby held adjacent partition 3 and the slide being held adjacent partition 4 (Fig. 3). The lower portion of the side wall of the latch 27 adjacent the slide 26, is provided at its front end with a lug 201 extending for the lowermost position of said latch, into the path of movement of the slide 26, whereby for said lowermost position, said lug 201 engages the upper portion of the end of the adjacent side wall of the slide with the slide in its rearmost or reset position, and holds the slide in that position against the action of the spring 192. The side wall of the latch 27 near the adjacent partition of the compartment, is provided with a forwardly extending arm 202 having at its front end a laterally extending lug 203 for raising the latch to release the slide from the lug 201, in the manner below described.

Figs. 21, 22 and 23 show the slide 26, the trigger latch 27 and the timing latch 28 in the compartment II in their different positions of operation. In Fig. 21, the slide 26 is in its rear or reset position, with the lug 201 in its position to prevent forward movement of the slide 26 and with a hook 28c on the timing latch 28 in an opening therefor in the bottom of the rear end portion of the slide, but with an appreciable clearance space between the hook and the rear edge of said opening. As shown in this figure, the slide resetting arm 46 is moving forwardly but has not quite completed its slide resetting movement, which resetting movement has, however, progressed sufficiently so that the latch 27 under the action of its spring 27a, has moved downwardly to its position holding the slide 26 against forward movement. The remaining small amount of forward movement of the arm 26 required to clear the arm from the resetting lever 187, moves the slide 26 rearwardly a small amount from the position shown in Fig. 21 thereby providing a small clearance between the front end of the slide and the holding lug 201 on the latch 27, thereby permitting the latch to move quickly, freely and accurately to its slide holding position, even for rapid movement of the operating handle 35. When the arm 46 has passed the lever 187, the spring 192 moves the slide 26 to the position shown in Fig. 21 against the lug 201, and also extends the lower end of the lever 187 slightly into the path of return movement of the bent end 46a of the arm 46, which in part accounts for providing the spring actuated pawl 199 on the lower end of the lever 187, to permit free return movement of the arm 46 and to avoid the possibility of damage to the parts which might otherwise occur during said return movement. During the remainder of the cycle of operation of the handle 35 after resetting the slide 26, the operation of the slide 26 is entirely controlled by the latches 27 and 28. It will be noted that in Fig. 21, the spring actuated pawl 194 is in a position spacing its forward end a substantial distance to the rear of the lower teeth of the ratchet wheel 21 attached to the totalizer wheel 20. It will also be noted that the spring actuated detent 145 is provided with a wedge-shaped pointed end 145a having widely diverging sides, so that if any operation of the ratchet wheel 21 moves one of its teeth under and past the pointed end 45a, the detent spring 148 will at once move the pointed end to a bottoming position between corresponding ones of said teeth and establish a centered relation of one of the digits on the totalizer wheel 20 relatively to the corresponding sight opening 33 in the casing 29.

Fig. 22 shows the parts illustrated in Fig. 21, in the relative positions they assume when the arm 202 is raised by movement of the totalizer wheel 20 of next lower order from its "9" to its "0" position. The relation of the parts shown in Fig. 22, is maintained until just before the end of the cycle of operation of the handle, illustrated by Figs. 21, 22 and 23.

For the position of the parts shown in Fig. 22, the slide 26 has moved forward a small amount, until the hook 28c engages the rear edge of the slide opening containing it, and for this position of the slide, the lug 201 now released from the lifting mechanism of the totalizer wheel 20 of next lower order, has dropped and is resting upon an upper edge of the slide 26 with the slide moved forwardly an amount sufficient to prevent engagement between said lug and the front end of the slide. The pawl 194 is now forward a small amount from its position shown in Fig. 21, but not enough so to engage the teeth of the ratchet wheel 21. The lever 187 is also moved a small amount around to the left on its supporting rod 195 which is a further reason for providing the lower end of the lever with the spring actuated pawl 199. The slide 26 is now under the sole control of the timing latch 28, and remains so until just before the end of the cycle of operation of the handle 35 under consideration.

In Fig. 23 the position of the parts is shown at the end of the cycle of operation of the handle 35. The timing latch 28 is in its releasing position by engagement with the lug 46b and the slide 26 is in its extreme forward position by the action of its spring 192. In moving to the position shown in Fig. 23, the pawl 194 has engaged the tooth of the ratchet wheel 21 shown in line with and in front of it in Figs. 21 and 22 and moved said tooth to the position shown in Fig. 23, thereby advancing the totalizer wheel 20 one unit, and accomplishing the carry-over operation indicated to be necessary by the raising previously in the same cycle of operation, of the arm 202 by rotation of the totalizer wheel of next lower order from its "9" to its "0" position.

Any slide 26 moved to its position shown in Fig. 23 during any cycle of operation of the handle 35, remains in that position until the first part of the next cycle of operation of said handle, and during about the second 10 degrees of the forward stroke of said next cycle, all of the slides that are in their forward or carry-over positions, are reset and moved to their extreme rear positions shown in Fig. 21, by the operation of the bent ends 46a of the arms 46 carried by the main shaft 43. Each of compartments II to VI inclusive is provided with carry-over mechanism identical with that shown and described in connection with Figs. 21, 22 and 23, and having the same mode of operation.

In Figs. 24, 25 and 26, the means employed to operate one of the trigger latches 27, is shown. In order to avoid confusion as to the planes of sectioning shown in Fig. 3, the carry-over mechanism shown in Figs. 24, 25 and 26 is that located in compartment III, but with the same force and effect as though the carry-over mechanism of compartment II were shown in said figures.

In Fig. 24, the lug 203 on the operating arm 202 of the trigger latch 27, is shown extending into the path of cam 104—II through a clearance opening 204 in the adjacent partition 4 and resting on the lower edge of said opening, which is the lowermost position of the latch 27 and arm 202 and which determines the extent that the lug 201 initially holding the slide 26 against forward movement, vertically overlaps the end of said slide. The cam 104—II of totalizer wheel 20—II, is shown in the position it has when the "9" digit on the totalizer wheel 20—II is displayed in the corresponding sight opening 33 in the casing 29. When the totalizer wheel 20—II is advanced to its "0" position, the cam 104—II is advanced to the position shown in Fig. 26 and during the advance of said cam, it raises the lug 203 to its uppermost position as shown in Fig. 25 at the mid-position of said advance movement, and at the end of said advance movement the cam has passed under and cleared said lug, which permits the arm 202 and latch 27 to drop to a lower position. This accomplishes the release of the slide 26, and permits the small amount of forward movement of said slide described above in connection with Fig. 22. It will be noted that the maximum lift of the lug 203 by the cam 104—II as shown in Fig. 25, is greater than that required to move the lug 201 upwards to its slide releasing position, which permits the small initial forward movement of the slide 26 above described, to take place free from any holding or frictional resistance of the latch 27, and insures that when the latch is freed from the cam 104—II, it will drop on an upper edge of the slide 26, since said slide is free to move immediately and without restraint, when the holding lug 201 is lifted from engagement with it. It will also be noted that the same result is secured as above described whether the advance movement of the totalizer wheel 20—II begins at its "9" position or at some lower position such as "7" or "5," and also whether said advance movement ends at the "0" position of said totalizer wheel or at some higher position such as "1" or "3," the only requisite for the operation shown by Figs. 24, 25 and 26 being that the advance movement of the totalizer wheel shall include moving it from its "9" to its "0" position. It is also to be noted that Fig. 26 shows the position of the trigger latch 27 when it is released by the cam 104—II and the slide 26 is in its position of initial movement shown in Fig. 25, as well as the position of said latch when the slide 26 has moved to its extreme forward or carry-over position shown in Fig. 26, since the position of the latch 27 is not changed after its release from the cam 104—II, by forward movement of the slide 26, the lug 201 resting upon and being in sliding engagement with an upper edge of said slide for its entire carry-over movement. In Fig. 25, the slide 26 is shown in its position released from the latch 27, but still held by the timing latch 28, and in Fig. 26 the slide is shown released from the latch 28 and in its extreme forward position.

Each of the studs 197 extending from the slides 26 for engagement by the levers 187, preferably has an over-all length slightly less than the distance between the partition walls of the compartment containing it, to hold the rear portion of the slide in proper lateral position in said compartment.

Each of the timing latches 28 above described is preferably formed from sheet metal with a U-shaped mounting portion through the parallel walls of which a supporting rod 205 extends with a sliding fit, which rod also extends with a sliding fit through the partitions 2 to 8 inclusive and is held in place as above described for the rod 90. As shown in Fig. 3 each timing latch 28 is closely adjacent the right hand partition of the compartment containing it, and the other side of said latch has extending from it towards the left hand partition of said compartment, a spacing lug 28d, to hold the hook 28c in alignment with the slide 26, and to hold the arm 28a in alignment with the lug 46b. The lever 187 preferably has a width at its supporting portion which holds it in substantially the lateral position shown in Fig. 3, with its lower end in alignment with the bent end 46a of the arm 46. It will be noted that the hook portion 28c is of such a length as to engage the under side of the rear end portion of the slide 26, even when said slide is in its extreme forward position, whereby said slide forms a stop limiting upward movement of the hook 28c when the latch 28 is released for slide-holding movement by forward movement of the arm 46.

As shown in Fig. 36, each of the index plates 25 is preferably supported by a plate 206 of sheet metal having openings at its upper and lower ends that are sliding fits on tie rods 12 and 13, said plate 206 being held centrally in the compartment containing it, by tubular spacers 17 and 18 respectively on the tie rods 12 and 13 between the plate 206 and the partitions containing it, so that by tightening the screws at the ends of said tie rods, said plates and partitions are rigidly held together in positions parallel with each other to constitute a part of the framework of the machine. The plate 206 shown in Fig. 36 has a circular outer edge coaxial with and of slightly larger radius then the corresponding sector 131, so that the latter may turn in the operation of the machine, without frictional engagement with the index plate 25 supported by the plate 206. The index plate 25 is preferably made of thin spring sheet material, for example, spring sheet metal, which before mounting on the plate 206 is straight or substantially so. The index plate is provided at its ends with central slots to receive the end portions of the plate 206, and adjacent the slots, the index plate is bent at 25a and 25b to form outwardly opening grooves extending laterally across it. The partitions adjacent the tie rods 12 and 13 are provided with recesses 207 and 208 forming seats for the bent ends 25a and 25b of the index plate when the latter is applied to the outer edge of the plate 206 and its bent ends are pressed towards the plate 206 to engage the entire length of the index plate between its end slots, with the outer edge of the plate 206, in which position, the index plate is securely held by retaining rods 209 and 210 in the end grooves in the index plate and extending with a sliding fit through holes therefor in portions of the plate 206 extending outwardly a small distance through the end slots in the index plate.

Fig. 27 illustrates mechanism for controlling the resetting of the totalizer wheels 20 to their "0" positions, and also devices preventing the resetting operation unless the slides 26 are in their rear positions with their pawls 194 entirely disengaged from the ratchet wheels 21.

As shown in Fig. 27, the flange member 79 is provided with a radial slot 211 extending from its outer edge nearly to its hub 80. During adding operations, the bent end 212 of a stop latch 213 is in the slot 211 and prevents rotary movement of the flange member 79 and of the attached shaft 23 supporting the totalizer wheels 20 (Fig. 15). The stop latch 213 is pivotally supported on a stud 214 rigidly secured to and extending outwardly from the partition 2. The latch 213 extends below and to the right of its pivot stud 214 and is there provided with an inclined flange 215 upon which rests the lower arm 216 of a T-shaped member 217. The upper arm 218 of said member 217 is curved and forms a plunger projecting through the casing 29 (Figs. 1 and 2), to by its depression, release the totalizer resetting mechanism when desired.

The stem portion of the member 217 extends rearwardly from the plunger 218 and at its rear portion it engages with a sliding fit a supporting rod 219, which also extends horizontally with a sliding fit through the upper edge portions of partitions 2 to 8 inclusive and is held in place in the manner above described for the rod 90. The rod 219 extends above and across all of the slides 26, and it also extends with a sliding fit through the end ears 220 projecting downward from a safety bar 221, which end ears are adjacent, outside of and in sliding engagement with the partitions 2 and 8 (Fig. 3). The bar 221 is provided with a downwardly turned front edge 221a extending over all of the slides 26 (Fig. 3), which edge for the upper position of the plunger 218, is just above, but out of contact with the upper edges of the slides 26 in their carry-over movements. Each of the slides 26 is provided with clearance recesses 26a in its upper edges at the portions of said edges under the bar 221 when the slide is held in its rear position shown in Figs. 4, 21 and 22, and to the rear of said recesses the sides of the slide are the full height of the slide. The pivotal end of the member 217 is interlocked with the adjacent end of the bar 221 in a manner requiring said member and bar to turn as a unit relatively to the rod 219, when either of said parts is so moved. A spring 222 encircling the stud 214 has its lower end anchored in the partition 2, and at its upper end extends under the flange 215 to hold said flange, the plunger 218, and the edge 221a in their upper positions, which also holds the bent end 212 in the slot 211 as shown in Fig. 27. To turn the flange member 79 in the direction of the arrow to effect a totalizer resetting operation, it must be released by depressing the plunger 218 to depress the flange 215 and raise the bent end 212 from its holding position in the slot 211, and this can be done if the recesses 26a of all of the slides 26 are below the curved edge 221a of the safety bar 221 when the plunger is so depressed, which is the case only when all of the slides 26 are in their rear positions shown in Figs. 4, 21 and 22. If, however, it is attempted to depress the plunger 218 when any one or more of the slides 26 is in its front position shown in Fig. 23, it cannot be done because of the curved edge 221a at once engaging the upper edges of the rear end of the said slide or slides in forward position, and preventing the movement of the stop latch 213 required to move its bent end 212 up and out of engagement with the slot 211. This safety feature prevents possible damage to the parts that might result if it were attempted to reset the totalizer wheels 20 to their "0" positions with one or more of the pawls 194 in engagement with a corresponding ratchet wheel or wheels 21. As shown in Figs. 3 and 27, the member 217 is provided with a lug 217a extending laterally therefrom to adjacent the end wall 1, to hold the member 217 adjacent the partition 2. A holding latch 223 is pivotally supported on a stud 224 secured to and extending from the partition 2, which latch 223 has an upwardly extending arm 225 resting against the lug 217a and provided with a hook 225a for engaging and holding said lug when the plunger 218 is moved to its lowermost position moving the bent end 212 from engagement with the slot 211. The holding latch 223 is also provided with a releasing arm 226 extending adjacent to the outer face of the flange member 79 and into the path of a releasing pin 227 carried by and extending from said flange member 79. A spring 228 encircles the stud 224 and is anchored at its lower end to the partition 2 and in engagement at its upper end with the holding latch 223 to hold the arm 225 of said latch against the lug 217a. Spacing lugs 223a and 223b extend from the holding latch 223 to adjacent the end wall 1 and partition 2 respectively, to hold said latch in operative position on the stud 224. With the construction shown in Fig. 27, depressing the plunger 218 with all of the slides 26 in their rear positions, engages the lug 217a with the hook 225a thus holding the plunger in its depressed position, and at the same time moves the bent end 212 from the slot 211 and permits rotary movement of the flange member 79 in the direction of the arrow, under and free from engagement with said bent end. Rotary movement is then imparted to the flange member 79 and shaft 23 in the direction of the arrow, by the resetting knob 34 (Fig. 15), which moves the pin 227 into engagement with and past the end of the arm 226, which moves the hook 225a from engagement with the lug 217a and permits the plunger 218 to move to its upper position and permits the bent end 212 to rest upon and press against the edge of the flange member 79. It will be noted that the wall of the slot 211 adjacent the pin 227, is lower than the other wall of said slot. Rotation of the flange member 79 and shaft 23 is continued in the direction of the arrow (Fig. 27), by the knob 34, until the higher wall of the slot 211 engages the bent end 212, which stops and limits rotary movement of the flange member 79 and shaft 23, and permits the bent end 212 to move into the slot 211 under the action of the spring 222. The rotary movement of the flange member 79 and shaft 23 just described engages the pawls 99 of the totalizer wheels 20 with the keyway 83 in the shaft 23, and advances said totalizer wheels as above described, until the bent end 212 of the latch 213, as above described engages the higher wall of the slot 211 and is moved into engagement with said slot by the spring 222.

The pawl 99 of totalizer wheel 20—I is spaced about 36 degrees ahead of the pawls 99 of the other totalizer wheels, relatively to the carry-over cams 104 of said wheels; and the digits on the totalizer wheels are disposed so that at the instant resetting rotation of the shaft 23 is stopped as described, the reading in the sight openings 33 will be 999990; but prior to the resetting rotation of the shaft 23, all of the slides 26 are as described below, in their rear positions and are held by the trigger latches 27 and are free from control by the timing latches 28, by an idle cycle of operation of the handle 35 immediately preceding the resetting operation; as a consequence, the movement of the totalizer wheel 20—I to its "0" position frees the slide 26—II from its trigger latch 27—II and this advances totalizer wheel 20—II to its "0" position; and in a similar manner each of the remaining totalizer wheels 20 is advanced one after the other, from its "9" position to its "0" position to show in the sight openings 33, a cleared or zero condition of the totalizer.

From the above description of the carry-over operation it will be noted that if the last cycle of operating movement of the handle 35 in any series of summating operations effected by the machine, involved a carry-over operation by one or more of the slides 26, said slide or slides will be left at the end of said cycle of operation in their forward positions. In view of this, each resetting operation of the totalizer wheels 20, should be preceded by an idle cycle of operation of the handle 35 to insure that all of the slides are in their rear positions, before beginning a resetting operation. In any event, when the plunger 218 cannot be depressed, and will not remain in a lower position when released in attempting to begin a resetting operation, it is an indication that such an idle cycle of operation should be given the handle 35, before further attempting said resetting operation.

In connection with the carry-over operations above described, in many cases the carry-over movement in any particular operation is simultaneously effected in the manner above described in all of the orders of units involved, by the simultaneous movement of all of the timing latches 28 to their slide-releasing positions; in some cases, however, the carry-over operation of the totalizer wheels 20 may be effected somewhat differently and be sequential. For example, if all of the totalizer wheels are in their "9" positions and the transfer operation requires one unit of advance of the wheel of the lowest order, the position of said wheels at the end of the forward stroke of the handle 35, will be 999990, slide 26—II will be released from its trigger latch 27—II and have one unit of carry-over stored in it, all of the other slides will still be held by their trigger latches, and all of the slides will still be under the control of their timing latches 28. Then at the end of the back stroke of the handle 35, all of the timing latches are simultaneously moved to release their slides 26, but the only immediate response is on the part of the slide 26—II, the remaining slides still being held by their trigger latches and under the sole control thereof; then the forward movement of slide 26—II effects the sequential operation of the remaining totalizer wheels in the manner above described in connection with a resetting operation of the totalizer wheels. The successive carry-over movements of the totalizer wheels in the manner just described, may occur so rapidly as to be easily mistaken for simultaneous operation of said wheels.

While I have shown my invention in the particular embodiment above described I do not limit myself thereto as I may employ equivalents thereof without departing from the scope of the appended claims.

Having thus described my invention, what I claim is:

1. In an adding machine, the combination of a plurality of totalizer wheels in ordered arrangement, a rod supporting said wheels for independent rotary movement, a transfer gear mounted on said rod adjacent each of said totalizer wheels for independent rotary movement and movable axially of said rod towards and from the corresponding totalizer wheel, keyboard mechanism including ordered set-up members independently movable to set up amounts to be summated, gearing permanently connecting each of said set-up members with said transfer gear of corresponding order and imparting unit-for-unit movement from said set-up member to said gear, each of said transfer gears having the same number of unit positions as and angularly aligned with the unit positions of the corresponding totalizer wheel, a first positive clutching member carried by each of said transfer gears, a second positive clutching member carried by each of said totalizer wheels for positive clutching engagement with the corresponding first clutching member for one of the axial positions of the corresponding transfer gear and for disengagement from said first clutching member for a second axial position of said transfer gear, and clutch-operating and keyboard-resetting means including cam devices effecting first the simultaneous and positive clutching engagement of all of said first clutching members with corresponding ones of said second clutching members by simultaneously moving all of said transfer gears axially and then while maintaining said clutching engagement effecting the resetting of said set-up members to their "0" positions, thereby positively advancing said totalizer wheels respectively amounts limited and corresponding to the amount of the set-up.

2. In an adding machine, the combination of a plurality of totalizer wheels in ordered arrangement, a rod supporting said wheels for independent rotary movement, a transfer gear mounted on said rod adjacent each of said totalizer wheels for independent rotary movement and movable axially of said rod towards and from the corresponding totalizer wheel, keyboard mechanism including ordered set-up members independently movable to set up amounts to be summated, gearing permanently connecting each of said set-up members with said transfer gear of corresponding order and imparting unit-for-unit movement from said set-up member to said gear, each of said transfer gears having the same number of unit positions as and angularly aligned with the unit positions of the corresponding totalizer wheel, a first positive clutching member carried by each of said transfer gears, a second positive clutching member carried by each of said totalizer wheels for positive clutching engagement with the corresponding first clutching member for one of the axial positions of the corresponding transfer gear and for disengagement from said first clutching member for a second axial position of said transfer gear, clutch-operating and keyboard-resetting means including cam devices effecting first the simultaneous and positive clutching engagement of all of said first clutching members with corresponding ones of said second clutching members by simultaneously moving all of said transfer gears axially and then while maintaining said clutching engagement effecting the resetting of said set-up members to their "0" positions, thereby positively advancing said totalizer wheels respectively amounts limited and corresponding to the amount of the set-up, first spring actuated detents tending to hold said totalizer wheels respectively against rotation, second spring actuated detents tending to hold said set-up members respectively in set-up position and including a common member supporting said second detents, said common member having a first position holding said second detents with maximum pressure against said set-up members, said common member being movable and having a second position substantially decreasing the holding pressure of said second detents, and spring means holding said common member in its first position against the action of said second detents, said operating and resetting means including cam mechanism effecting the movement of said common member from its first position to its second position while the positive engagement of said clutch members with each other is being effected.

3. In an adding machine, the combination of a plurality of totalizer wheels in ordered arrangement, a rod supporting said wheels for independent rotary movement, a transfer gear mounted on said rod adjacent each of said totalizer wheels for independent rotary movement and movable axially of said rod towards and from the corresponding totalizer wheel, keyboard mechanism including ordered set-up members independently movable to set up amounts to be summated, gearing permanently connecting each of said set-up members with said transfer gear of corresponding order and imparting unit-for-unit movement from said set-up member to said gear, each of said transfer gears having the same number of unit positions as and angularly aligned with the unit positions of the corresponding totalizer wheel, a first positive clutching member carried by each of said transfer gears, a second positive clutching member carried by each of said totalizer wheels for positive clutching engagement with the corresponding first clutching member for one of the axial positions of the corresponding transfer gear and for disengagement from said first clutching member for a second axial position of said transfer gear, clutch-operating and keyboard-resetting means including cam devices effecting first the simultaneous and positive clutching engagement of all of said first clutching members with corresponding ones of said second clutching members by simultaneously moving all of said transfer gears axially and then while maintaining said clutching engagement effecting the resetting of said set-up members to their "0" positions, thereby positively advancing said totalizer wheels respectively amounts limited and corresponding to the amount of the set-up, first spring actuated detents tending to hold said totalizer wheels respectively against rotation, second spring actuated detents tending to hold said set-up members respectively in set-up position and including a common member supporting said second detents, said common member having a first position holding said second detents with maximum pressure against said set-up members, said common member being movable and having a second position substantially decreasing the holding pressure of said second detents, spring means holding said common member in its first position against the action of said second detents, said operating and resetting means including cam mechanism effecting the movement of said common member from its first position to its second position while the positive engagement of said clutch members with each other is being effected, and a ratchet wheel rigidly secured to each of said totalizer wheels and engaged by a corresponding one of said first detents and comprising the corresponding one of said second clutching members.

4. In an adding machine, the combination of a plurality of totalizer wheels in ordered arrangement, a rod supporting said wheels for independent rotary movement, a transfer gear mounted on said rod adjacent each of said totalizer wheels for independent rotary movement and movable axially of said rod towards and from the corresponding totalizer wheel, keyboard mechanism including ordered set-up members independently movable to set up amounts to be summated, gearing permanently connecting each of said set-up members with said transfer gear of corresponding order and imparting unit-for-unit movement from said set-up member to said gear, each of said transfer gears having the same number of unit positions as and angularly aligned with the unit positions of the corresponding totalizer wheel, a first positive clutching member carried by each of said transfer gears, a second positive clutching member carried by each of said totalizer wheels for positive clutching engagement with the corresponding first clutching member for one of the axial positions of the corresponding transfer gear and for disengagement from said first clutching member for a second axial position of said transfer gear, and clutch-operating and keyboard-resetting means including cam devices effecting first the simultaneous and positive clutching engagement of all of said first clutching members with corresponding ones of said second clutching members by simultaneously moving all of said transfer gears axially and then while maintaining said clutching engagement effecting the resetting of said set-up members to their "0" positions, thereby positively advancing said totalizer wheels respectively amounts limited and corresponding to the amount of the set-up, said cam devices after said resetting operation also effecting the disengagement of said first clutching members from said second clutching members while maintaining the reset positions of said set-up members.

5. In an adding machine, the combination of a plurality of totalizer wheels in ordered arrangement, a rod supporting said wheels for independent rotary movement, a transfer gear mounted on said rod adjacent each of said totalizer wheels for independent rotary movement and movable axially of said rod towards and from the corresponding totalizer wheel, keyboard mechanism including ordered set-up members independently movable to set up amounts to be summated, gearing permanently connecting each of said set-up members with said transfer gear of corresponding order and imparting unit-for-unit movement from said set-up member to said gear, each of said transfer gears having the same number of unit positions as and angularly aligned with the unit positions of the corresponding totalizer wheel, a first positive clutching member carried by each of said transfer gears, a second positive clutching member carried by each of said totalizer wheels for positive clutching engagement with the corresponding first clutching member for one of the axial positions of the corresponding transfer gear and for disengagement from said first clutching member for a second axial position of said transfer gear, clutch-operating and keyboard-resetting means including cam devices effecting first the simultaneous and positive clutching engagement of all of said first clutching members with corresponding ones of said second clutching members by simultaneously moving all of said transfer gears axially and then while maintaining said clutching engagement effecting the resetting of said set-up members to their "0" positions, thereby positively advancing said totalizer wheels respectively amounts limited and corresponding to the amount of the set-up, said set-up members comprising oscillatory sectors, a second rod supporting said sectors for rotary movement, and a visual indicator for each sector showing its set-up position.

6. In an adding machine, the combination of a plurality of totalizer wheels in ordered arrangement, a rod supporting said wheels for independent rotary movement, a transfer gear mounted on said rod adjacent each of said totalizer wheels for independent rotary movement and movable axially of said rod towards and from the corresponding totalizer wheel, keyboard mechanism including ordered set-up members independently movable to set up amounts to be summated, gearing permanently connecting each of said set-up members with said transfer gear of corresponding order and imparting unit-for-unit movement from said set-up members to said gear, each of said transfer gears having the same number of unit positions as and angularly aligned with the unit positions of the corresponding totalizer wheel, a first positive clutching member carried by each of said transfer gears, a second positive clutching member carried by each of said totalizer wheels for positive clutching engagement with the corresponding first clutching member for one of the axial positions of the corresponding transfer gear and for disengagement from said first clutching member for a second axial position of said transfer gear, clutch-operating and keyboard-resetting means including cam devices effecting first the simultaneous and positive clutching engagement of all of said first clutching members with corresponding ones of said second clutching members by simultaneously moving all of said transfer gears axially and then while maintaining said clutching engagement effecting the resetting of said set-up members to their "0" positions, thereby positively advancing said totalizer wheels respectively amounts limited and corresponding to the amount of the set-up, said set-up members comprising oscillatory sectors, a second rod supporting said sectors for rotary movement, a visual indicator for each sector showing its set-up position, said gearing comprising gear teeth carried by each of said sectors, a pinion permanently in mesh with the gear teeth carried by each of said sectors and also permanently in mesh with a corresponding transfer gear, and a third rod supporting said pinions for rotary movement.

7. In an adding machine, the combination of a plurality of totalizer wheels in ordered arrangement, a rod supporting said wheels for independent rotary movement, a transfer gear mounted on said rod adjacent each of said totalizer wheels for independent rotary movement and movable axially of said rod towards and from the corresponding totalizer wheel, keyboard mechanism including ordered set-up members independently movable to set up amounts to be summated, gearing permanently connecting each of said set-up members with said transfer gear of corresponding order and imparting unit-for-unit movement from said set-up member to said gear, each of said transfer gears having the same number of unit positions as and angularly aligned with the unit positions of the corresponding totalizer wheel, a first positive clutching member carried by each of said transfer gears, a second positive clutching member carried by each of said totalizer wheels for positive clutching engagement with the corresponding first clutching member for one of the axial positions of the corresponding transfer gear and for disengagement from said first clutching member for a second axial position of said transfer gear, clutch-operating and keyboard-resetting means including cam devices effecting first the simultaneous and positive clutching engagement of all of said first clutching members with corresponding ones of said second clutching members by simultaneously moving all of said transfer gears axially and then while maintaining said clutching engagement effecting the resetting of said set-up members to their "0" positions, thereby positively advancing said totalizer wheels respectively amounts limited and corresponding to the amount of the set-up, first spring actuated detents tending to hold said totalizer wheels respectively against rotation, second spring actuated detents tending to hold said set-up members respectively in set-up position and including a common member supporting said second detents, said common member having a first position holding said second detents with maximum pressure against said set-up members, said common member being movable and having a second position substantially decreasing the holding pressure of said second detents, spring means holding said common member in its first position against the action of said second detents, said operating and resetting means including cam mechanism effecting the movement of said common member from its first postion to its second position while the positive engagement of said clutch members with each other is being effected, said set-up members comprising oscillatory sectors, a second rod supporting said sectors for rotary movement, and a visual indicator for each sector showing its set-up position, said sectors carrying detent teeth respectively engaging said second detents.

8. In an adding machine, the combination of a plurality of totalizer wheels in ordered arrangement, a rod supporting said wheels for independent rotary movement, a transfer gear mounted on said rod adjacent each of said totalizer wheels for independent rotary movement and movable axially of said rod towards and from the corresponding totalizer wheel, keyboard mechanism including ordered set-up members independently movable to set up amounts to be summated, gearing permanently connecting each of said set-up members with said transfer gear of corresponding order and imparting unit-for-unit movement from said set-up member to said gear, each of said transfer gears having the same number of unit positions as and angularly aligned with the unit positions of the corresponding totalizer wheel, a first positive clutching member carried by each of said transfer gears, a second positive clutching member carried by each of said totalizer wheels for positive clutching engagement with the corresponding first clutching member for one of the axial positions of the corresponding transfer gear and for disengagement from said first clutching member for a second axial position of said transfer gear, and clutch-operating and keyboard-resetting means including cam devices effecting first the simultaneous and positive clutching engagement of all of said first clutching members with corresponding ones of said second clutching members by simultaneously moving all of said transfer gears axially and then while maintaining said clutching engagement effecting the resetting of said set-up members to their "0" positions, thereby positively advancing said totalizer wheels respectively amounts limited and corresponding to the amount of the set-up, said clutch-operating and keyboard resetting means including a main operating shaft limited to less than a full rotation, a first cam carried by said shaft and having a rising surface effecting simultaneous movement of said transfer gears towards the corresponding totalizing wheels thereby engaging said first clutching members with said second clutching members, said first cam having a delay surface following said rising surface and maintaining said clutching engagement, and a second cam carried by said shaft and having a delay surface followed by a rising surface which effects the resetting of said set-up members to their "0" positions, the effect of the rising surface of said first cam ending in the operating movement of said shaft at substantially the beginning of the effect of the rising surface of said second cam, the delay effected by the delay surface of said first cam continuing substantially throughout the resetting operation effected by the rising surface of said second cam.

9. In an adding machine, the combination of a plurality of totalizer wheels in ordered arrangement, a rod supporting said wheels for independent rotary movement, a transfer gear mounted on said rod adjacent each of said totalizer wheels for independent rotary movement and movable axially of said rod towards and from the corresponding totalizer wheel, keyboard mechanism including ordered set-up members independently movable to set up amounts to be summated, gearing permanently connecting each of said set-up members with said transfer gear of corresponding order and imparting unit-for-unit movement from said set-up member to said gear, each of said transfer gears having the same number of unit positions as and angularly aligned with the unit positions of the corresponding totalizer wheel, a first positive clutching member carried by each of said transfer gears, a second positive clutching member carried by each of said totalizer wheels for positive clutching engagement with the corresponding first clutching member for one of the axial positions of the corresponding transfer gear and for disengagement from said first clutching member for a second axial position of said transfer gear, and clutch-operating and keyboard-resetting means including cam devices effecting first the simultaneous and positive clutching engagement of all of said first clutching members with corresponding ones of said second clutching members by simultaneously moving all of said transfer gears axially and then while maintaining said clutching engagement effecting the resetting of said set-up members to their "0" positions, thereby positively advancing said totalizer wheels respectively amounts limited and corresponding to the amount of the set-up, said clutch-operating and keyboard resetting means including a main operating shaft limited to less than a full rotation, a first cam carried by said shaft and having a rising surface effecting simultaneous movement of said transfer gears towards the corresponding totalizing wheels thereby engaging said first clutching members with said second clutching members, said first cam having a delay surface following said rising surface and maintaining said clutching engagement, and a second cam carried by said shaft and having a delay surface followed by a rising surface which effects the resetting of said set-up members to their "0" positions, the effect of the rising surface of said first cam ending in the operating movement of said shaft at substantially the beginning of the effect of the rising surface of said second cam, the delay effected by the delay surface of said first cam continuing substantially throughout the resetting operation effected by the rising surface of said second cam, said first cam having a second rising surface at the end of its delay surface effecting the disengagement of said clutching members from each other, and said second cam having a second delay surface holding said reset condition during said disengagement.

10. In an adding machine, the combination of a plurality of totalizer wheels in ordered arrangement, a rod supporting said wheels for independent rotary movement, a transfer gear mounted on said rod adjacent each of said totalizer wheels for indepedent rotary movement and movable axially of said rod towards and from the corresponding totalizer wheel, keyboard mechanism including ordered set-up members independently movable to set up amounts to be summated, gearing permanently connecting each of said set-up members with said transfer gear of corresponding order and imparting unit-for-unit movement from said set-up member to said gear, each of said transfer gears having the same number of unit positions as and angularly aligned with the unit positions of the corresponding totalizer wheel, a first positive clutching member carried by each of said transfer gears, a second positive clutching member carried by each of said totalizer wheels for positive clutching engagement with the corresponding first clutching member for one of the axial positions of the corresponding transfer gear and for disengagement from said first clutching member for a second axial position of said transfer gear, clutch-operating and keyboard-resetting means including cam devices effecting first the simultaneous and positive clutching engagement of all of said first clutching members with corresponding ones of said second clutching members by simultaneously moving all of said transfer gears axially and then while maintaining said clutching engagement effecting the resetting of said set-up members to their "0" positions, thereby positively advancing said totalizer wheels respectively amounts limited and corresponding to the amount of the set-up, a clutch shaft parallel with and spaced from said rod and mounted for axial movement and restrained against angular movement, and an operating plate for each of said transfer gears rigidly carried by said clutch shaft and extending therefrom towards and connected with one of said transfer gears, said connection permitting free angular movement of the connected transfer gear and restraining said gear against axial movement relatively to the connected plate, whereby axial movement of said clutch shaft imparts corresponding axial movement simultaneously to all of said transfer gears, said clutch operating means including a main operating shaft limited to less than one full rotation of movement, a first cam rigidly carried by said operating shaft, a bar extending from said first cam towards said clutch shaft and movable longitudinally by said first cam, and a lifting cam carried by said bar and engaging said clutch shaft, said clutch shaft having a spring tending to hold it in retracted and clutch disengaging position, said first cam having first a rising surface imparting longitudinal movement to said bar towards said clutch shaft and then a delay surface holding said bar in its operated position, and said lifting cam having first a lifting surface which by engagement with said clutch shaft moves the latter and also said transfer gears and said first clutching members to clutching position, said lifting cam following its lifting surface having a delay surface holding said first clutching members in clutching engagement with said second clutching members.

11. In an adding machine, the combination of a plurality of totalizer wheels in ordered arrangement, a rod supporting said wheels for independent rotary movement, a transfer gear mounted on said rod adjacent each of said totalizer wheels for independent rotary movement and movable axially of said rod towards and from the corresponding totalizer wheel, keyboard mechanism including ordered set-up members independently movable to set up amounts to be summated, gearing permanently connecting each of said set-up members with said transfer gear of corresponding order and imparting unit-for-unit movement from said set-up member to said gear, each of said transfer gears having the same number of unit positions as and angularly aligned with the unit positions of the corresponding totalizer wheel, a first positive clutching member carried by each of said transfer gears, a second position clutching member carried by each of said totalizer wheels for positive clutching engagement with the corresponding first clutching member for one of the axial positions of the corresponding transfer gear and for disengagement from said first clutching member for a second axial position of said transfer gear, clutch-operating and keyboard-resetting means including cam devices effecting first the simultaneous and positive clutching engagement of all of said first clutching members with corresponding ones of said second clutching members by simultaneously moving all of said transfer gears axially and then while maintaining said clutching engagement effecting the resetting of said set-up members to their "0" positions, thereby positively advancing said totalizer wheels respectively amounts limited and corresponding to the amount of the set-up, a clutch shaft parallel with and spaced from said rod and mounted for axial movement and restrained against angular movement, and an operating plate for each of said transfer gears rigidly carried by said clutch shaft and extending therefrom towards and connected with one of said transfer gears, said connection permitting free angular movement of the connected transfer gear and restraining said gear against axial movement relatively to the connected plate, whereby axial movement of said clutch shaft imparts corresponding axial movement simultaneously to all of said transfer gears, said clutch operating means including a main operating shaft limited to less than one full rotation of movement, a first cam rigidly carried by said operating shaft, a bar extending from said first cam towards said clutch shaft and movable longitudinally by said first cam, and a lifting cam carried by said bar and engaging said clutch shaft, said clutch shaft having a spring tending to hold it in retracted and clutch disengaging position, said first cam having first a rising surface imparting longitudinal movement to said bar towards said clutch shaft and then a delay surface holding said bar in its operated position, and said lifting cam having first a lifting surface which by engagement with said clutch shaft moves the latter and also said transfer gears and said first clutching members to clutching position, said lifting cam following its lifting surface having a delay surface holding said first clutching members in clutching engagement with said second clutching members, said first cam following its said delay surface having a second rising surface imparting further longitudinal movement to said bar, said lifting cam following its delay surface having a clearance opening which for said further movement of said bar releases said clutch shaft, thereby by the action of the retracting spring of the clutch shaft, effecting the movement of said clutch shaft and said first clutching members to their clutch disengaging positions.

12. In an adding machine, the combination of a plurality of totalizer wheels in ordered arrangement, a rod supporting said wheels for independent rotary movement, a transfer gear mounted on said rod adjacent each of said totalizer wheels for independent rotary movement and movable axially of said rod towards and from the corresponding totalizer wheel, keyboard mechanism including ordered set-up members independently movable to set up amounts to be summated, gearing permanently connecting each of said set-up members with said transfer gear of corresponding order and imparting unit-for-unit movement from said set-up member to said gear, each of said transfer gears having the same number of unit positions as and angularly aligned with the unit positions of the corresponding totalizer wheel, a first positive clutching member carried by each of said transfer gears, a second positive clutching member carried by each of said totalizer wheels for positive clutching engagement with the corresponding first clutching member for one of the axial positions of the corresponding transfer gear and for disengagement from said first clutching member for a second axial position of said transfer gear, clutch-operating and keyboard-resetting means including cam devices effecting first the simultaneous and positive clutching engagement of all of said first clutching members with corresponding ones of said second clutching members by simultaneously moving all of said transfer gears axially and then while maintaining said clutching engagement effecting the resetting of said set-up members to their "0" positions, thereby positively advancing said totalizer wheels respectively amounts limited and corresponding to the amount of the set-up, a clutch shaft parallel with and spaced from said rod and mounted for axial movement and restrained against angular movement, and an operating plate for each of said transfer gears rigidly carried by said clutch shaft and extending therefrom towards and connected with one of said transfer gears, said connection permitting free angular movement of the connected transfer gear and restraining said gear against axial movement relatively to the connected plate, whereby axial movement of said clutch shaft imparts corresponding axial movement simultaneously to all of said transfer gears, said clutch operating means including a main operating shaft limited to less than one full rotation of movement, a first cam rigidly carried by said operating shaft, a bar extending from said first cam towards said clutch shaft and movable longitudinally by said first cam, and a lifting cam carried by said bar and engaging said clutch shaft, said clutch shaft having a spring tending to hold it in retracted and clutch disengaging position, said first cam having first a rising surface imparting longitudinal movement to said bar towards said clutch shaft and then a delay surface holding said bar in its operated position, and said lifting cam having first a lifting surface which by engagement with said clutch shaft moves the latter and also said transfer gears and said first clutching members to clutching position, said lifting cam following its lifting surface having a delay surface holding said first clutching members in clutching engagement with said second clutching members, said first cam following its said delay surface having a second rising surface imparting further longitudinal movement to said bar, said lifting cam following its delay surface having a clearance opening which for said further movement of said bar releases said clutch shaft, thereby by the action of the retracting spring of the clutch shaft, effecting the movement of said clutch shaft and said first clutching members to their clutch disengaging positions, said lifting cam having spring-controlled pivotal connection with said bar, whereby for retracting movement of said bar said lifting cam rides over its previously engaged portion of said clutch shaft without movement of the latter.

13. In an adding machine, the combination of a plurality of totalizer wheels in ordered arrangement, a rod supporting said wheels for independent rotary movement, a transfer gear mounted on said rod adjacent each of said totalizer wheels for independent rotary movement and movable axially of said rod towards and from the corresponding totalizer wheel, keyboard mechanism including ordered set-up members independently movable to set up amounts to be summated, gearing permanently connecting each of said set-up members with said transfer gear of corresponding order and imparting unit-for-unit movement from said set-up member to said gear, each of said transfer gears having the same number of unit positions as and angularly aligned with the unit positions of the corresponding totalizer wheel, a first positive clutching member carried by each of said transfer gears, a second positive clutching member carried by each of said totalizer wheels for positive clutching engagement with the corresponding first clutching member for one of the axial positions of the corresponding transfer gear and for disengagement from said first clutching member for a second axial position of said transfer gear, clutch-operating and keyboard-resetting means including cam devices effecting first the simultaneous and positive clutching engagement of all of said first clutching members with corresponding ones of said second clutching members by simultaneously moving all of said transfer gears axially and then while maintaining said clutching engagement effecting the resetting of said set-up members to their "0" positions, thereby positively advancing said totalizer wheels respectively amounts limited and corresponding to the amount of the set-up, a clutch shaft parallel with and spaced from said rod and mounted for axial movement and restrained against angular movement, and an operating plate for each of said transfer gears rigidly carried by said clutch shaft and extending therefrom towards and connected with one of said transfer gears, said connection permitting free angular movement of the connected transfer gear and restraining said gear against axial movement relatively to the connected plate, whereby axial movement of said clutch shaft imparts corresponding axial movement simultaneously to all of said transfer gears, said clutch operating means including a main operating shaft limited to less than one full rotation of movement, a first cam rigidly carried by said operating shaft, a bar extending from said first cam towards said clutch shaft and movable longitudinally by said first cam, and a lifting cam carried by said bar and engaging said clutch shaft, said clutch shaft having a spring tending to hold it in retracted and clutch disengaging position, said first cam having first a rising surface imparting longitudinal movement to said bar towards said clutch shaft and then a delay surface holding said bar in its operated position, and said lifting cam having first a lifting surface which by engagement with said clutch shaft moves the latter and also said transfer gears and said first clutching members to clutching position, said lifting cam following its lifting surface having a delay surface holding said first clutching members in clutching engagement with said second clutching members, said clutch shaft having a flat sided cross-section and said operating plates having similarly shaped openings fitting said clutch shaft, whereby angular movement of said operating plates relatively to each other and relatively to said clutch shaft is prevented.

14. In an adding machine, the combination of a plurality of totalizer wheels in ordered arrangement, a rod supporting said wheels for independent rotary movement, a transfer gear mounted on said rod adjacent each of said totalizer wheels for independent rotary movement and movable axially of said rod towards and from the corresponding totalizer wheel, keyboard mechanism including ordered set-up members independently movable to set up amounts to be summated, gearing permanently connecting each of said set-up members with said transfer gear of corresponding order and imparting unit-for-unit movement from said set-up member to said gear, each of said transfer gears having the same number of unit positions as and angularly aligned with the unit positions of the corresponding totalizer wheel, a first positive clutching member carried by each of said transfer gears, a second positive clutching member carried by each of said totalizer wheels for positive clutching engagement with the corresponding first clutching member for one of the axial positions of the corresponding transfer gear and for disengagement from said first clutching member for a second axial position of said transfer gear, clutch-operating and keyboard-resetting means including cam devices effecting first the simultaneous and positive clutching engagement of all of said first clutching members with corresponding ones of said second clutching members by simultaneously moving all of said transfer gears axially and then while maintaining said clutching engagement effecting the resetting of said set-up members to their "0" positions, thereby positively advancing said totalizer wheels respectively amounts limited and corresponding to the amount of the set-up, said set-up members comprising oscillatory sectors, a second rod supporting said sectors for rotary movement, a visual indicator for each sector showing its set-up position, and a main operating shaft limited to less than one full rotation, said resetting means including a second shaft parallel to said main shaft and parallel to said second rod, a cam rigidly carried by said main shaft, an operating arm rigidly carried by said second shaft and operated by said cam, and resetting arms rigidly carried by said second shaft and extending respectively adjacent said sectors, said sectors having studs extending respectively into the paths of resetting movement of said resetting arms, said studs during a set-up operation having movement towards said resetting arms determined respectively by the set-up amount, whereby operation of said cam operates said second shaft and said resetting arms to move said sectors to their "0" positions.

15. In an adding machine, the combination of a plurality of totalizer wheels in ordered arrangement, a rod supporting said wheels for independent rotary movement, a transfer gear mounted on said rod adjacent each of said totalizer wheels for independent rotary movement and movable axially of said rod towards and from the corresponding totalizer wheel, keyboard mechanism including ordered set-up members independently movable to set up amounts to be summated, gearing permanently connecting each of said set-up members with said transfer gear of corresponding order and imparting unit-for-unit movement from said set-up member to said gear, each of said transfer gears having the same number of unit positions as and angularly aligned with the unit positions of the corresponding totalizer wheel, a first positive clutching member carried by each of said transfer gears, a second positive clutching member carried by each of said totalizer wheels for positive clutching engagement with the corresponding first clutching member for one of the axial positions of the corresponding transfer gear and for disengagement from said first clutching member for a second axial position of said transfer gear, clutch-operating and keyboard-resetting means including cam devices effecting first the simultaneous and positive clutching engagement of all of said first clutching members with corresponding ones of said second clutching members by simultaneously moving all of said transfer gears axially and then while maintaining said clutching engagement effecting the resetting of said set-up members to their "0" positions, thereby positively advancing said totalizer wheels respectively amounts limited and corresponding to the amount of the set-up, said set-up members comprising oscillatory sectors, a second rod supporting said sectors for rotary movement, a visual indicator for each sector showing its set-up position, and a main operating shaft limited to less than one full rotation, said resetting means including a second shaft parallel to said main shaft and parallel to said second rod, a cam rigidly carried by said main shaft, an operating arm rigidly carried by said second shaft and operated by said cam, and resetting arms rigidly carried by said second shaft and extending respectively adjacent said sectors, said sectors having studs extending respectively into the paths of resetting movement of said resetting arms, said studs during a set-up operation having movement towards said resetting arms determined respectively by the set-up amount, whereby operation of said cam operates said second shaft and said resetting arms to move said sectors to their "0" positions, said main shaft and said second shaft having each a flat-sided cross-section and said cam and said arms having similarly shaped openings respectively fitting said shafts, whereby angular movement of each of said shafts relatively to said parts carried by it is prevented.

IVAN ENGSTROM.

REFERENCES CITED

The following references are of record in the file of this patent:

UNITED STATES PATENTS

| Number | Name | Date |
| --- | --- | --- |
| 910,853 | Pike | Jan. 26, 1909 |
| 1,078,359 | Landsiedel | Nov. 11, 1913 |
| 1,477,116 | Giglio | Dec. 11, 1923 |
| 1,797,995 | Nielson | Mar. 24, 1931 |
| 1,932,621 | Green | Oct. 31, 1933 |
| 1,932,670 | Ohmer | Oct. 31, 1933 |
| 2,130,723 | Kottmann | Sept. 20, 1938 |
| 2,158,142 | Muller | May 16, 1939 |